US012772233B2

(12) United States Patent
Zhang et al.

(10) Patent No.: US 12,772,233 B2
(45) Date of Patent: Oct. 20, 2026

(54) CROSS BWP/CC UE SIM REPORT

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Jelena Damnjanovic, Del Mar, CA (US); Peter Gaal, San Diego, CA (US); Junyi Li, Fairless Hills, PA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 457 days.

(21) Appl. No.: 17/935,066

(22) Filed: Sep. 23, 2022

(65) Prior Publication Data

US 2024/0107520 A1 Mar. 28, 2024

(51) Int. Cl.
*H04W 72/1268* (2023.01)
*H04L 5/14* (2006.01)
*H04W 16/28* (2009.01)
*H04W 72/54* (2023.01)

(52) U.S. Cl.
CPC ........... *H04W 72/1268* (2013.01); *H04L 5/14* (2013.01); *H04W 16/28* (2013.01); *H04W 72/54* (2023.01)

(58) Field of Classification Search
None
See application file for complete search history.

(56) References Cited

U.S. PATENT DOCUMENTS

| | | | | |
|---|---|---|---|---|
| 2013/0044621 | A1 | 2/2013 | Jung et al. | |
| 2018/0013466 | A1* | 1/2018 | Kim | H04L 5/0044 |
| 2019/0313437 | A1* | 10/2019 | Jung | H04L 5/0042 |
| 2020/0119890 | A1* | 4/2020 | Yeh | H04L 5/14 |
| 2020/0374807 | A1* | 11/2020 | Zhang | H04L 5/0091 |
| 2021/0143954 | A1* | 5/2021 | Duan | H04B 7/06968 |

(Continued)

FOREIGN PATENT DOCUMENTS

| | | | |
|---|---|---|---|
| WO | 2006020400 | A2 | 2/2006 |
| WO | 2020222458 | A1 | 11/2020 |

OTHER PUBLICATIONS

International Search Report and Written Opinion—PCT/US2023/032909—ISA/EPO—May 10, 2024.

(Continued)

*Primary Examiner* — Sudesh M. Patidar
*Assistant Examiner* — Justin Michael Whitaker
(74) *Attorney, Agent, or Firm* — Procopio, Cory, Hargreaves & Savitch LLP

(57) ABSTRACT

Apparatus, methods, and computer program products for SIM reporting are provided. An example method may include receiving, from a second network entity, scheduling information for a PUCCH transmission and generating SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective TCI state and a respective receive beam associated with a respective TCI state.

25 Claims, 19 Drawing Sheets

(56) References Cited

U.S. PATENT DOCUMENTS

| | | | | |
|---|---|---|---|---|
| 2021/0235301 | A1* | 7/2021 | Abedini | H04L 5/14 |
| 2021/0351832 | A1 | 11/2021 | Zhang et al. | |
| 2022/0078798 | A1 | 3/2022 | Kumar | |
| 2024/0188074 | A1* | 6/2024 | Löhr | H04W 72/1268 |

OTHER PUBLICATIONS

Partial International Search Report—PCT/US2023/032909—ISA/EPO—Jan. 26, 2024.

* cited by examiner

CROSS BWP/CC UE SIM REPORT

TECHNICAL FIELD

The present disclosure relates generally to communication systems, and more particularly, to wireless communication systems with self-interference measurement (SIM) reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The at least one processor may be configured to receive, from a second network entity, scheduling information for a physical uplink control channel (PUCCH) transmission. The at least one processor may be configured to generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state. The at least one processor may be configured to transmit, to the second network entity in the PUCCH transmission, feedback information corresponding to a transmission. The at least one processor may be configured to transmit, to the second network entity in the PUCCH transmission, a SIM report at a location after the feedback information, where the SIM report includes information indicative of the SIM information.

In another aspect of the disclosure, a method, a computer-readable medium, and an apparatus at a UE are provided. The apparatus may include a memory and at least one processor coupled to the memory. The at least one processor may be configured to generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with at least one component carrier (CC), and where the SIM information is associated with multiple bandwidth parts (BWPs). The at least one processor may be configured to transmit, to a second network entity, a SIM report including information indicative of the SIM information.

In another aspect of the disclosure, a method, a computer-readable medium, and an apparatus at a UE are provided. The apparatus may include a memory and at least one processor coupled to the memory. The at least one processor may be configured to generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with multiple resource blocks (RB s) or multiple subbands (SBs). The at least one processor may be configured to transmit, to a second network entity, a SIM report including information indicative of the SIM information.

In another aspect of the disclosure, a method, a computer-readable medium, and an apparatus at a UE are provided. The apparatus may include a memory and at least one processor coupled to the memory. The at least one processor may be configured to generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple component carriers (CCs). The at least one processor may be configured to transmit, to a second network entity, a SIM report including information indicative of the SIM information.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
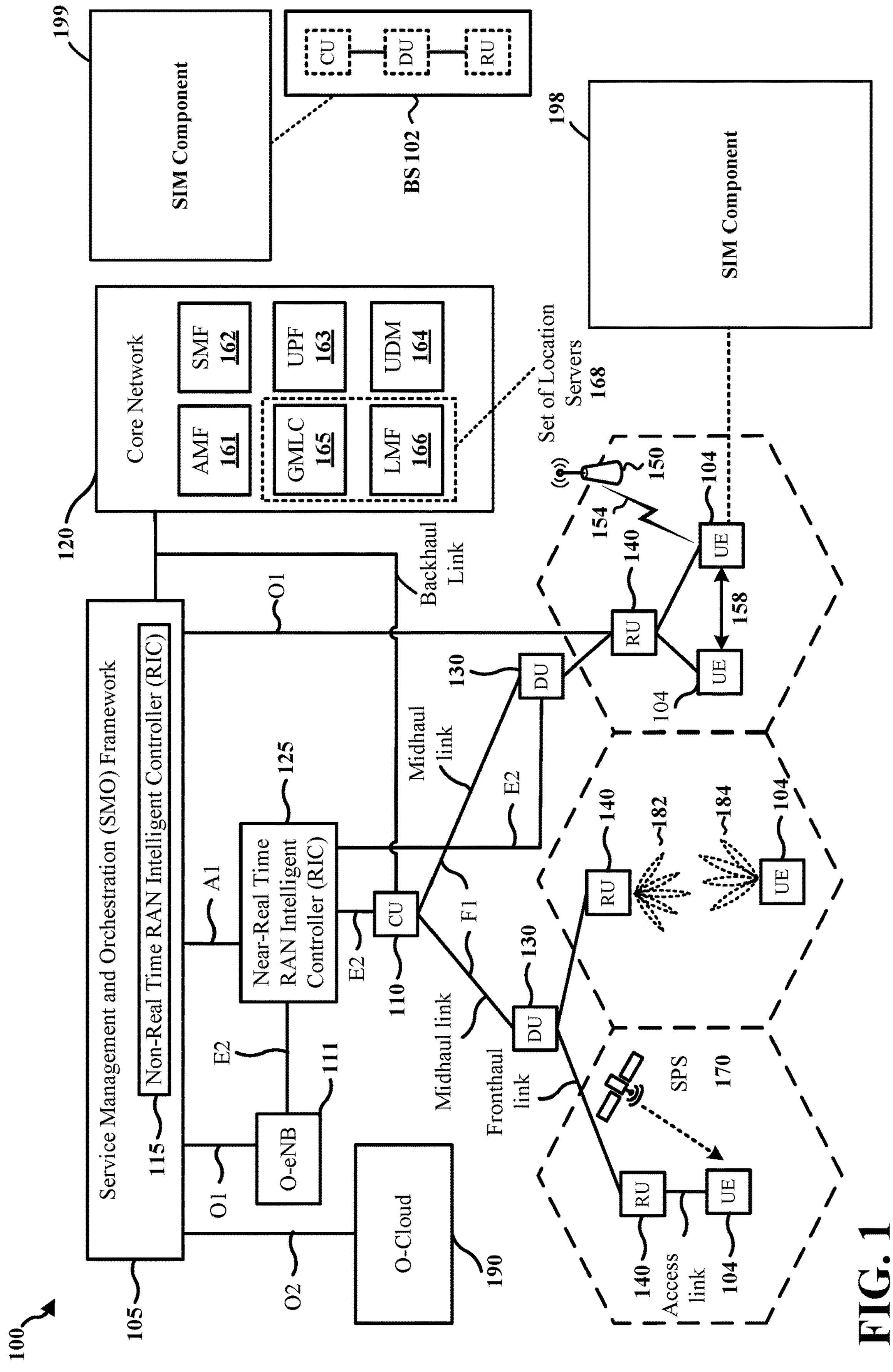
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term “sub-6 GHz” or the like if used herein may broadly represent frequencies that may be less than 6 GHz, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a SIM component 198. The SIM component 198 may be configured to receive, from a second network entity, scheduling information for a physical uplink control channel (PUCCH) transmission. The SIM component 198 may be further configured to generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state. The SIM component 198 may be further configured to transmit, to the second network entity in the PUCCH transmission, feedback information corresponding to a transmission. The SIM component 198 may be further configured to transmit, to the second network entity in the PUCCH transmission, a SIM report at a location after the feedback information, where the SIM report includes information indicative of the SIM information.

The SIM component 198 may be configured to generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple component carriers (CCs). The SIM component 198 may be further configured to transmit, to a second network entity, a SIM report including information indicative of the SIM information.

The SIM component 198 may be configured to generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with at least one component carrier (CC), and where the SIM information is associated with multiple bandwidth parts (BWPs). The SIM component 198 may be further configured to transmit, to a second network entity, a SIM report including information indicative of the SIM information.

The SIM component 198 may be configured to generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with multiple resource blocks (RBs) or multiple subbands (SBs). The SIM component 198 may be further configured to transmit, to a second network entity, a SIM report including information indicative of the SIM information.

In certain aspects, the base station 102 may include a SIM component 199. In some aspects, the SIM component 199 may be configured to transmit, to a first network entity, scheduling information for a physical uplink control channel (PUCCH) transmission. In some aspects, the SIM component 199 may be configured to receive, from the first network entity in the PUCCH transmission, feedback information corresponding to a transmission. In some aspects, the SIM component 199 may be configured to receive, from the first network entity, a self-interference measurement (SIM) report at a location after the feedback information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state.

In some aspects, the SIM component 199 may be configured to establish a communication interface with a first network entity. In some aspects, the SIM component 199 may be configured to receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple component carriers (CCs).

In some aspects, the SIM component 199 may be configured to establish a communication interface with a first network entity. In some aspects, the SIM component 199 may be configured to receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with at least one component carrier (CC), and where the SIM information is associated with multiple bandwidth parts (BWPs).

In some aspects, the SIM component 199 may be configured to establish a communication interface with a first network entity. In some aspects, the SIM component 199 may be configured to receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple resource blocks (RBs) or multiple subbands (SBs).

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
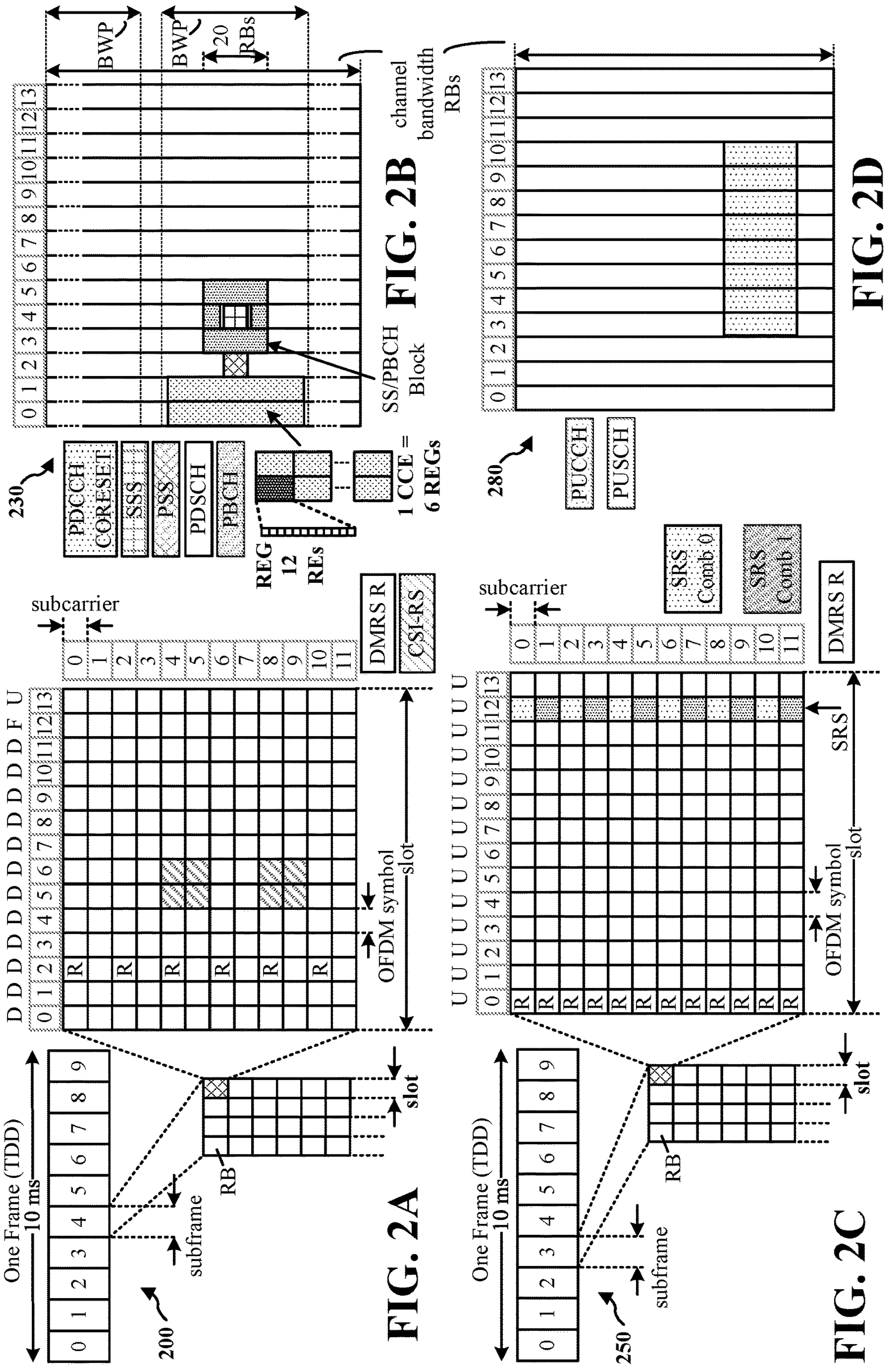
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}$ *15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
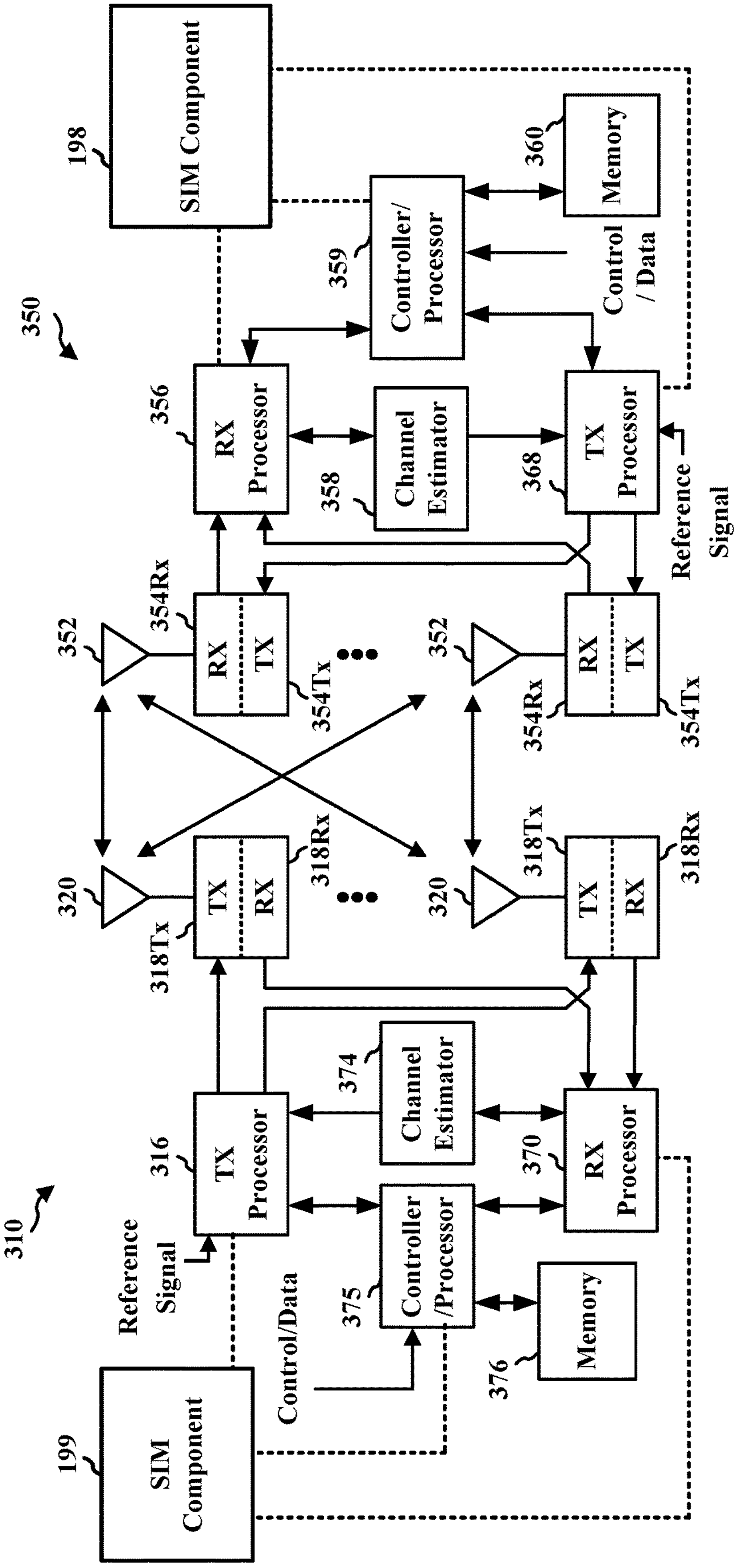
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with SIM component 198 of FIG. 1.

At least one of the TX processor 316, the RX processor 370, and the controller/processor 375 may be configured to perform aspects in connection with SIM component 199 of FIG. 1.

In some wireless communication systems, full-duplex (FD) capability (supporting simultaneous UL or DL transmission) may be present at the network entity (such as a base station), the UE, or both the network entity and the UE. For example, at the UE, UL transmissions may be transmitted from a first panel of the UE while simultaneous DL receptions may be received at a second panel of the UE. The first panel and the second panel may be different panels of the antenna(s) on the UE. As another example, at the base station, UL receptions may be received from a first panel of the base station while simultaneous DL transmissions may be transmitted at a second panel of the base station. The first panel and the second panel may be different panels of the antenna(s) on the base station.

By supporting FD, latency of communications may be potentially reduced. For example, it may be possible for a UE to receive DL signal in slots assigned for UL, which may enable latency savings. Furthermore, by supporting FD, spectrum efficiency per cell and per UE may be improved because resource utilization over the spectrum may be more efficient.

Figure 4A:
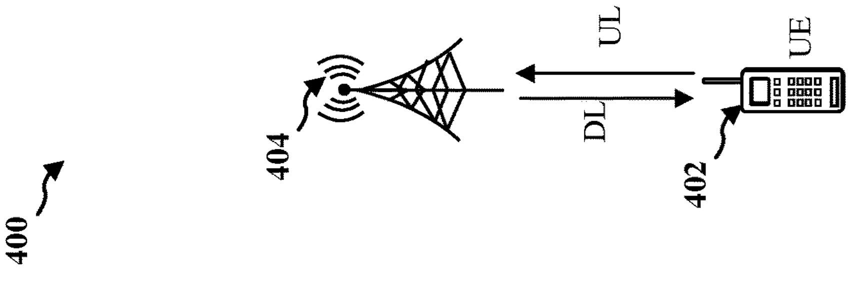
FIG. 4A is a diagram illustrating example full duplex operations.

FIG. 4A is a diagram 400 illustrating example full duplex operations. As illustrated in FIG. 4A, an FD TRP 404 of a network entity may be transmitting DL communications to an FD UE 402 while receiving UL communications from the FD UE 402. The FD UE 402 may be transmitting UL communications to the FD TRP 404 while receiving DL communications from the FD TRP 404.

Figure 4B:
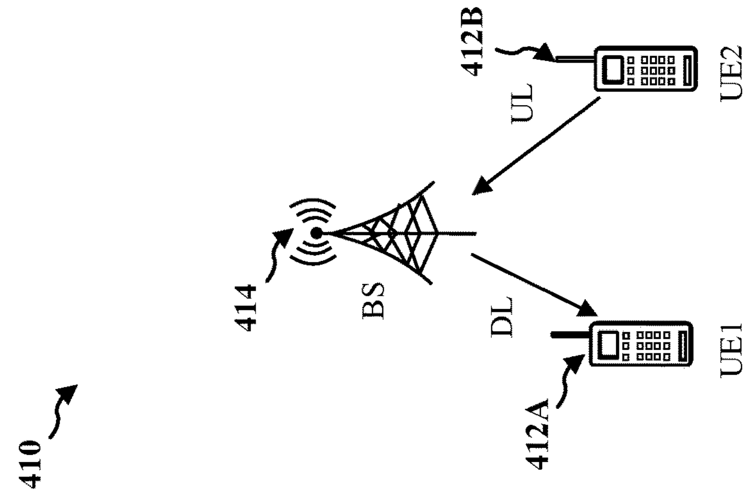
FIG. 4B is a diagram illustrating example full duplex operations.

FIG. 4B is a diagram 410 illustrating example full duplex operations. As illustrated in FIG. 4B, an FD TRP 414 of a network entity may be transmitting DL communications to a first UE 412A while receiving UL communications from a second UE 412B. In some aspects, the first UE 412A and the second UE 412B may be half-duplex (HD) and may not support FD operations. In some aspects, the first UE 412A and the second UE 412B may support FD operations and may be operating in a HD mode.

Figure 4C:
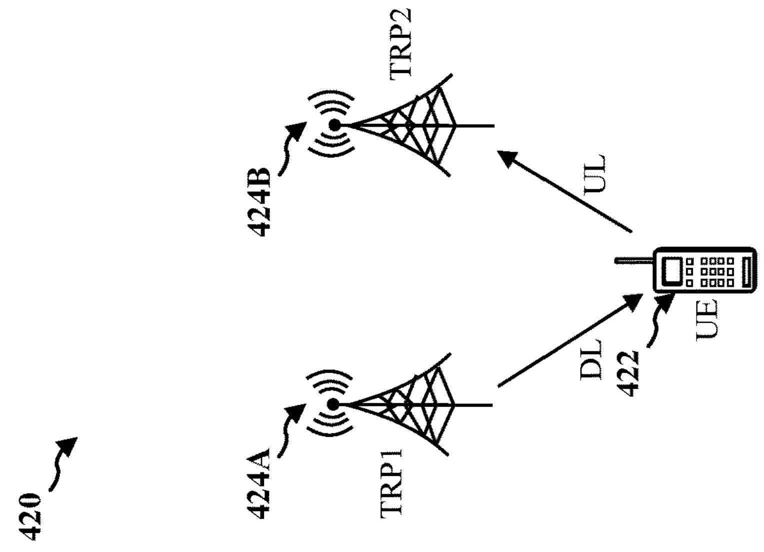
FIG. 4C is a diagram illustrating example full duplex operations.

FIG. 4C is a diagram 420 illustrating example full duplex operations. As illustrated in FIG. 4C, an FD UE 422 may be simultaneously connected to a first TRP 424A and a second TRP 424B. The FD UE 422 may be receiving DL communications from the first TRP 424A while transmitting UL communications to the second TRP 424B. In some aspects, the first TRP 424A and the second TRP 424B may be HD and may not support FD operations. In some aspects, the first TRP 424A and the second TRP 424B may support FD operations and may be operating in a HD mode.

Figure 5A:
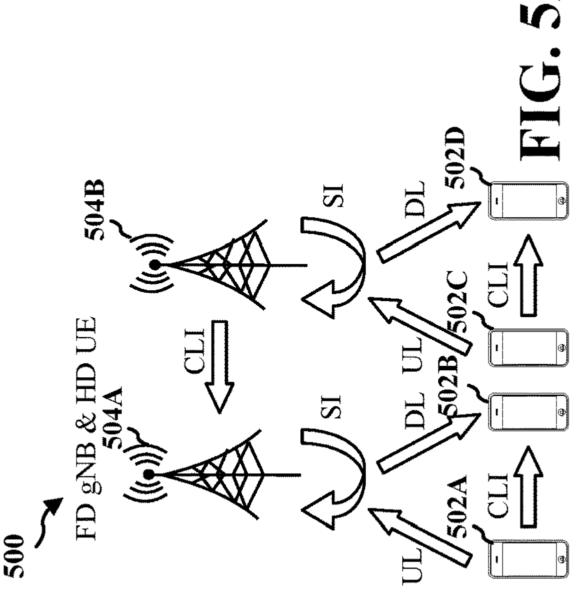
FIG. 5A is a diagram illustrating example communication between full duplex network entity and half duplex UE.

FIG. 5A is a diagram 500 illustrating example communication between a full duplex network entity and a half duplex UE. As illustrated in diagram 500 in FIG. 5A, two TRPs, TRP 504A and TRP 504B operating in full-duplex mode and four UEs, UE 502A, UE 502B, UE 502C, and UE 502D operating in half-duplex mode are shown in the depicted example. While the TRP 504A may be simultaneously transmitting downlink data to the UE 502B and receiving uplink data from the UE 502A, self-inference between the uplink reception and the downlink transmission at the TRP 504A may occur. For example, a receiver at the TRP may receive the transmitted downlink signal as interference to the uplink signal. Similarly, self-interference between the uplink reception and the downlink transmission at the TRP 504B may occur. In some aspects, because the UE 502B may be receiving downlink data and the UE 502A may be simultaneously transmitting uplink data, the transmission from the UE 502A may cause cross-link interference (CLI) to the downlink signal being received by the UE 502B. Similarly, the transmission from the UE 502C may cause CLI to the downlink signal being received by the UE 502D. Moreover, because the TRP 504B may also be receiving uplink data from the UE 502C and transmitting downlink data to the UE 502D, CLI between the TRP 504A and the TRP 504B may occur.

Figure 5B:
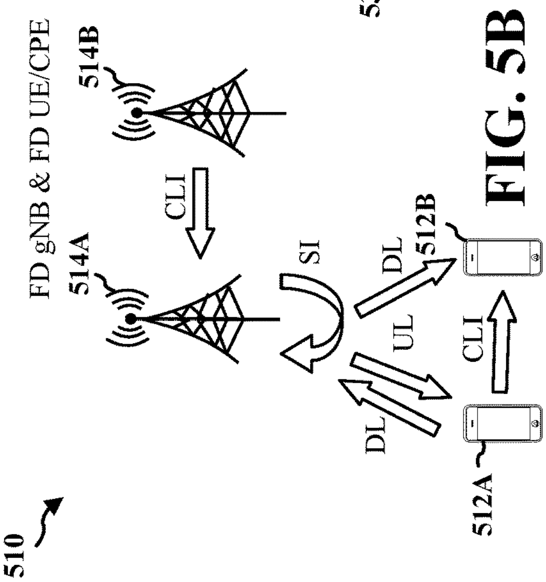
FIG. 5B is a diagram illustrating example communication between full duplex network entity and full duplex UE.

FIG. 5B is a diagram 510 illustrating example communication between full duplex network entity and full duplex UE. As illustrated in diagram 500 in FIG. 5A, two TRPs, TRP 514A and TRP 514B operating in full-duplex mode and two UEs, UE 512A and UE 512B operating in full duplex mode are included. The TRP 514A may be transmitting a downlink transmission to the UE 512A while simultaneously receiving an uplink transmission from the UE 512A. The TRP 514A may be also transmitting a downlink transmission to the UE 512B. Self-interference from uplink transmission to downlink reception at the UE 512A may occur. Self-interference from downlink transmission to uplink reception at the TRP 514A may also occur. If the TRP 514B is transmitting at the same time, CLI may also occur at the TRP 514A.

Figure 5C:
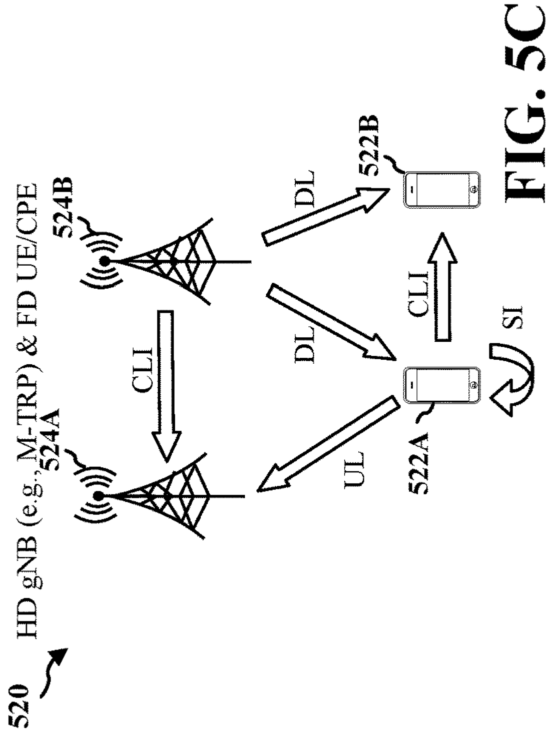
FIG. 5C is a diagram illustrating example communication between half duplex network entity and full duplex UE.

FIG. 5C is a diagram 520 illustrating example communication between half duplex network entity and full duplex UE. As illustrated in FIG. 5C, a TRP 524A and a TRP 524B may be operating in a HD mode and a UE 522A and a UE 522B may be operating in a FD mode. The UE 522A may be simultaneously transmitting an uplink transmission to the TRP 524A and receiving a downlink transmission from the TRP 524B. At the same time, the UE 522B may be receiving a downlink transmission from the TRP 524B. Self-interference from uplink transmission to downlink reception at the UE 522A may occur. CLI may also occur for the UE 522B because the UE 522B may receive the uplink transmission from the UE 522A while receiving the downlink transmission from the TRP 524B.

Figure 5D:
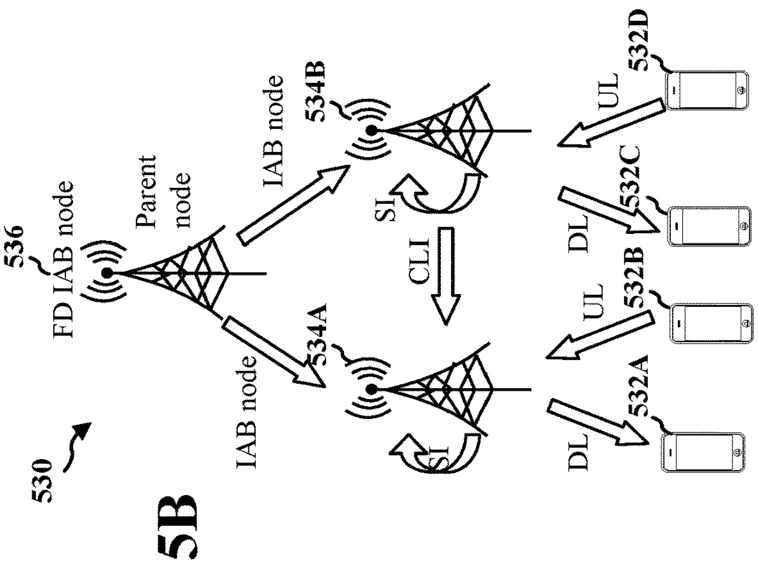
FIG. 5D is a diagram illustrating example full duplex integrated access and backhaul (IAB).

FIG. 5D is a diagram 530 illustrating example full duplex integrated access and backhaul (IAB). As illustrated in diagram 530 in FIG. 5D, two TRPs, TRP 534A and TRP 534B operating in full-duplex mode and four UEs, UE 532A, UE 532B, UE 532C, and UE 532D operating in half-duplex mode are shown in the depicted example. The TRP 534A and the TRP 534B may be IAB nodes that belong to a same parent node 536. While the TRP 534A may be simultaneously transmitting downlink data to the UE 532A and receiving uplink data from the UE 532B, self-inference between the uplink reception and the downlink transmission at the TRP 534A may occur. For example, a receiver at the TRP may receive the transmitted downlink signal as interference to the uplink signal. Similarly, self-interference between the uplink reception and the downlink transmission at the TRP 534B may occur. Moreover, because the TRP 534B may also be receiving uplink data from the UE 532C and transmitting downlink data to the UE 532D, CLI between the TRP 534A and the TRP 534B may occur.

As previously described, an FD network node, such as a base station or UE in the cellular network, may communicate simultaneously in UL and DL with two half-duplex panels using the same radio resources. Due to the simultaneous Tx/Rx nature of FD communication, a UE may experience self-interference caused by signal leakage from the transmitting panel to the receiving panel. Such interference (e.g., self-interference or interference caused by other devices) may impact the quality of the communication or even lead to a loss of information. Therefore, beam separations and other mitigation methods may be used to support FD capability. Cluster echo (which may be otherwise referred to as "cluster interference") from surrounding objects may also be present. Therefore, a UE capable of FD communication may not always work in FD mode due to the potentially high interference. Aspects provided herein may enable a UE to report self-interference measurement (SIM) to a network entity across different component carriers (CCs) or bandwidth parts (BWPs) for each beam pair, which may enable mitigation of UE SIM and may in turn improve FD operation performance. Carrier aggregation may be a mechanism where multiple frequency blocks (which may be referred to as "CCs") are assigned to a same UE. As used herein, the term "BWP" may refer to a continuous set of physical RBs on a carrier. The RBs may be selected from a subset of common RBs for one numerology. As used herein, the term "self-interference measurement (SIM)" may refer to one or more measurements based on SIM metric(s) such as received signal strength indicator (RSSI), reference signal received power (RSRP), or other measurements and related statistics of measurements related to a self-interference transmitted from a transmission antenna panel to a reception antenna panel at a device (e.g. an UE operating in full duplex mode).

In some aspects, a base station may transmit a beamformed signal to a UE in one or more directions. The UE may receive the beamformed signal from the base station in one or more receive directions. The UE may also transmit a beamformed signal to the base station. The base station may receive the beamformed signal from the UE in the one or more of the receive directions. The base station and the UE may perform beam training to determine the best receive and transmit directions for each of the base station and the UE. The transmit and receive directions for the base station may or may not be the same. The transmit and receive directions for the UE may or may not be the same. The term beam may be otherwise referred to as "spatial filter." Beamforming may be otherwise referred to as "spatial filtering."

In response to different conditions, the UE may determine to switch beams. The beam at the UE may be used for reception of downlink communication and/or transmission of uplink communication. In some examples, the base station may send a transmission that triggers a beam switch by the UE. A TCI state, which may correspond to a beam, may include quasi-co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RS s in one RS set and PDSCH/PDCCH DM-RS ports. TCI states can provide information about different beam selections for the UE to use for transmitting/receiving various signals.

A TCI state may be defined to represent at least one source RS to provide a reference (e.g., UE assumption) for determining quasi-co-location (QCL) or spatial filters. For example, a TCI state may define a QCL assumption between a source RS and a target RS.

Figure 6:
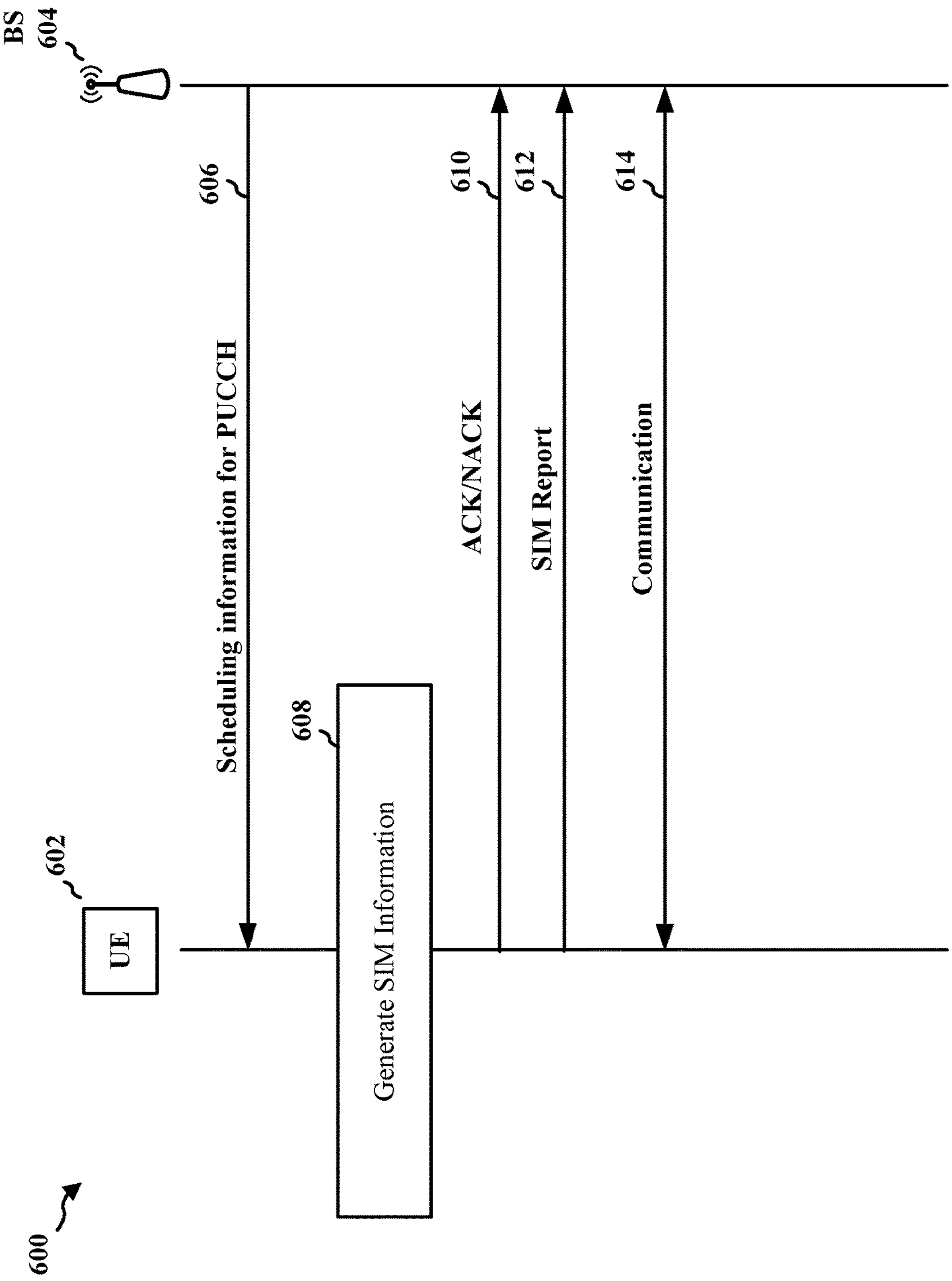
FIG. 6 is a diagram illustrating example communications between a network entity and a UE.

FIG. 6 is a diagram 600 illustrating example communications between a network entity 604 and a UE 602. In some aspects, the network entity 604 may be implemented as an aggregated base station, a disaggregated base station, an integrated access and backhaul (IAB) node, a relay node, a sidelink node, or the like. In some aspects, the network entity 604 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

As illustrated in FIG. 6, the UE 602 may receive scheduling information 606 for a PUCCH transmission from the network entity 604. Upon receiving the scheduling information 606 for the PUCCH transmission, the UE 602 may transmit an ACK/NACK feedback 610 in the PUCCH transmission to the network entity 604. The UE 602 may generate SIM information at 608 based on at least one SIM metric, such as RSSI or RSRP. In some aspects, the UE 602 may autonomously (e.g., without explicit instruction from the network) report the generated SIM information in a SIM report 612 per full duplex transmission/reception (Tx/Rx) beam pair (e.g., and corresponding TCI state) with piggybacked additional attached bits at the end of the ACK/NACK feedback 610 in the PUCCH transmission. In some aspects, the SIM report 612 may be attached at an end of the ACK/NACK feedback 610 without the network entity 604 configuring a size or a location of the SIM report 612 in the PUCCH transmission. In some aspects, the SIM information generated at 608 may include SIM information for each respective full duplex transmission and reception beam pair of the set of full duplex transmission and reception beam pairs.

In some aspects, upon receiving the SIM report 612, the network entity 604 may accordingly perform blind detection on the SIM report 612. In some aspects, the network entity 604 may configure one or more bits on the ACK/NACK feedback 610 so that the UE 602 may piggyback the SIM report 612 (which may be a latest version of the SIM information) including information indicative of the generated SIM information (e.g., indicative of measured SI metric per full duplex Tx/Rx beam pair) to the ACK/NACK feedback 610. In some aspects, the network entity may not perform blind detection because the one or more bits carrying the SIM report 612 on the ACK/NACK feedback 610 may be configured by the network entity 604. As used herein, the term "piggyback" may refer to a mechanism of attaching one or more bits carrying other data to an ACK/NACK transmission. The ACK/NACK transmission may be delayed to piggyback the one or more bits. In some aspects, the network entity 604 may configure a size and a location of the SIM report 612 in the PUCCH transmission, and the UE 602 may attach the SIM report 612 to the ACK/NACK feedback 610 based on the size and the location configured by the network entity 604. In some aspects, the SIM report 612 may include information indicative of the SIM information generated at 608. For example, in some aspects, the SIM report 612 may include statistics, an average, a median, or a weighted average of multiple SIM metrics over a time window (e.g., configured by the network entity 604). In some aspects, to include information indicative of the SIM information generated at 608, the SIM report 612 may include the same information as the SIM information generated at 608. In some aspects, to include information indicative of the SIM information generated at 608, the SIM report 612 may include less information than the SIM information generated at 608. In some aspects, the SIM information generated at 608 may be not reported at a first time instance and the UE 602 may generate a later version of the SIM information at a second instance later than the first time instance. In some aspects, the SIM report 612 may include a statistic associated with a set of downlink RBs or a set of downlink SBs. In some aspects, the statistic may include at least one of an average, a median, or a weighted average of multiple SIM metrics over a time window (e.g., configured by the network entity 604). In some aspects, the SIM report 612 may include various other statistics associated with the SIM information generated at 608. In some aspects, the SIM report 612 may be generated based on one or more rules and may include information indicative of the SIM information generated at 608. For example, the SIM report 612 may be indicative of the SIM information generated at 608 and may include one or more bits representing whether the measured SIM is above a threshold, or the like.

In some aspects, the SIM report 612 may be a cross CC UE SIM report. In some aspects, the report of the measured SI metric per full duplex Tx/Rx beam pair may be measured on multiple CCs at 608 and the UE 602 may generate and transmit signal a multi-CC report (as the SIM report 612) for the network entity 604 to schedule DL and UL communication 614 on different CCs. For example, for frequency division multiplexed (FDMed) FD UE, UL Tx may be on a first CC (CC1). The CC1 may have different leaked interference levels to DL RBs/SBs if the DL BW is at the RBs/SBs of CC1, compared with the DL BW at the RBs/SBs of another CC (e.g., CC N). The information on the interference level at different CCs may help the network entity 604 to schedule DL and UL communication 614 on same or different CCs for FDMed FD UE. In some aspects, the UE 602 may generate SIM information and report (in the SIM report 612) on MAC control element (MAC-CE) active CCs (e.g., CCs indicated to be active based on a MAC-CE). In some aspects, the UE 602 may generate SIM information and report (in the SIM report 612) on all CCs. In some aspects, the UE 602 may generate SIM information and report (in the SIM report 612) on a set of CCs indicated by the network entity 604. In some aspects, the UE 602 may generate SIM information and report (in the SIM report 612) on a set of CCs recommended by the UE 602.

In some aspects, the SIM report 612 may be a cross BWP UE SIM report. In some aspects, the report of the measured SI metric per full duplex Tx/Rx beam pair may be measured on BWPs per each measured CC and the UE 602 may generate and signal a multi-BWP report (e.g., the SIM report 612) for the network entity 604 to schedule DL and UL communication 614 on different BWPs. For example, for FDMed FD UE, UL Tx may be on a first BWP (BWP1). The BWP1 may have different leaked interference levels to DL RBs/SBs if the DL BW is at the RBs/SBs of BWP1, compared with the DL BW at the RBs/SBs of another BWP (e.g., BWP N). The information on the interference level at different BWPs may help the network entity 604 to schedule DL and UL communication 614 on same or different BWPs for FDMed FD UE. In some aspects, the UE 602 may generate SIM information and report (in the SIM report 612) on active BWPs. In some aspects, the UE 602 may generate SIM information and report (in the SIM report 612) on all BWPs. In some aspects, the UE 602 may generate SIM information and report (in the SIM report 612) on a set of BWPs indicated by the network entity 604. In some aspects, the UE 602 may generate SIM information and report (in the SIM report 612) on a set of BWPs recommended by the UE 602.

In some aspects, the SIM report 612 may be a N RBs/SBs UE SIM Report, N being a positive integer. For example, the UE 602 may report N adjacent or non-adjacent DL RBs/SBs around UL Tx RBs. The N DL RBs/SBs may be associated with one or more BWPs or CCs. In some aspects, the N DL RBs/SBs may belong to a same BWP or a same CC. In some aspects, the N DL RBs/SBs may belong to multiple BWPs or multiple CCs. In some aspects, the quantity of N may be configured by the network entity 604. In some aspects, the SBs may be configured by the network entity 604 and may be configured as part of frequency allocations.

Figure 7:
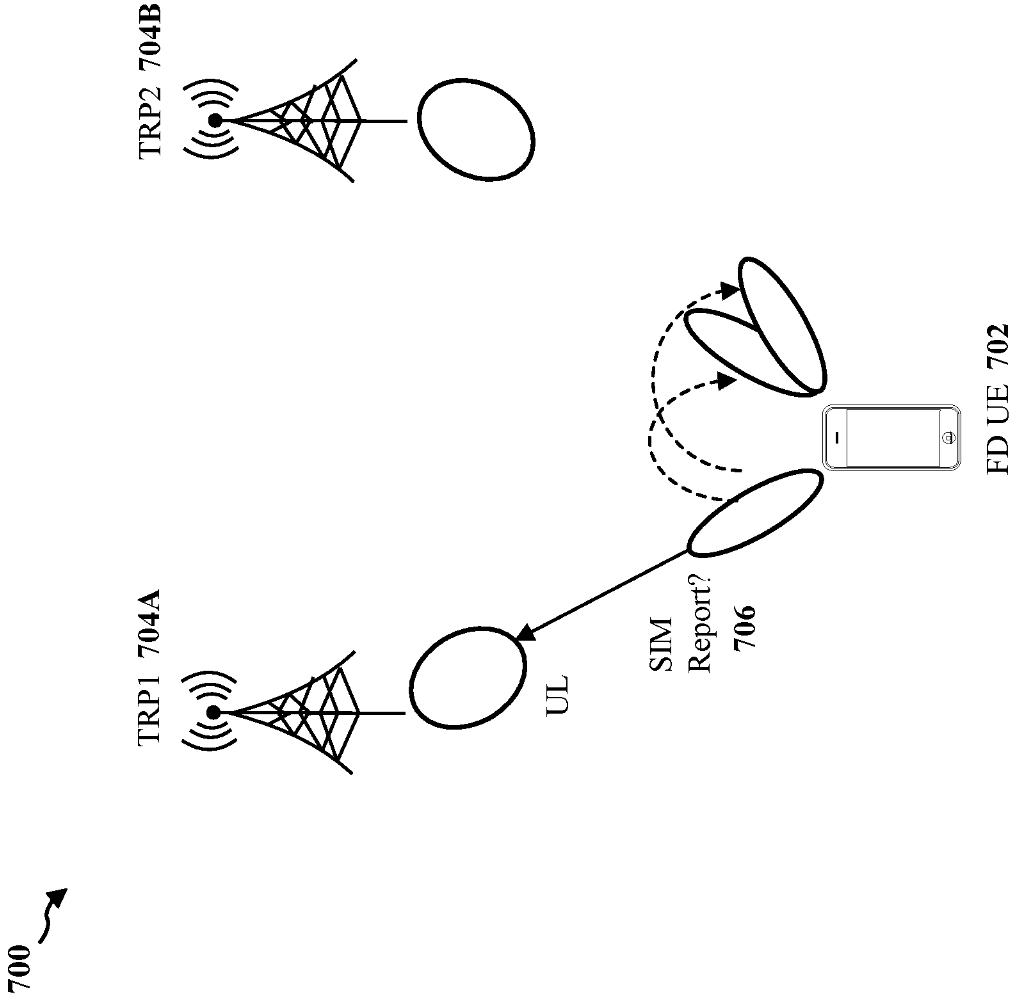
FIG. 7 is a diagram illustrating example self-interference measurement (SIM) report.

FIG. 7 is a diagram 700 illustrating example SIM report. As illustrated in FIG. 7, the TRP 704A may correspond to the network entity 604 and the UE 602 may correspond to the UE 702. There may be a second TRP 704B. The UE 702 may transmit a SIM report 706, which may correspond to the SIM report 612, to the TRP 704A.

Figure 8:
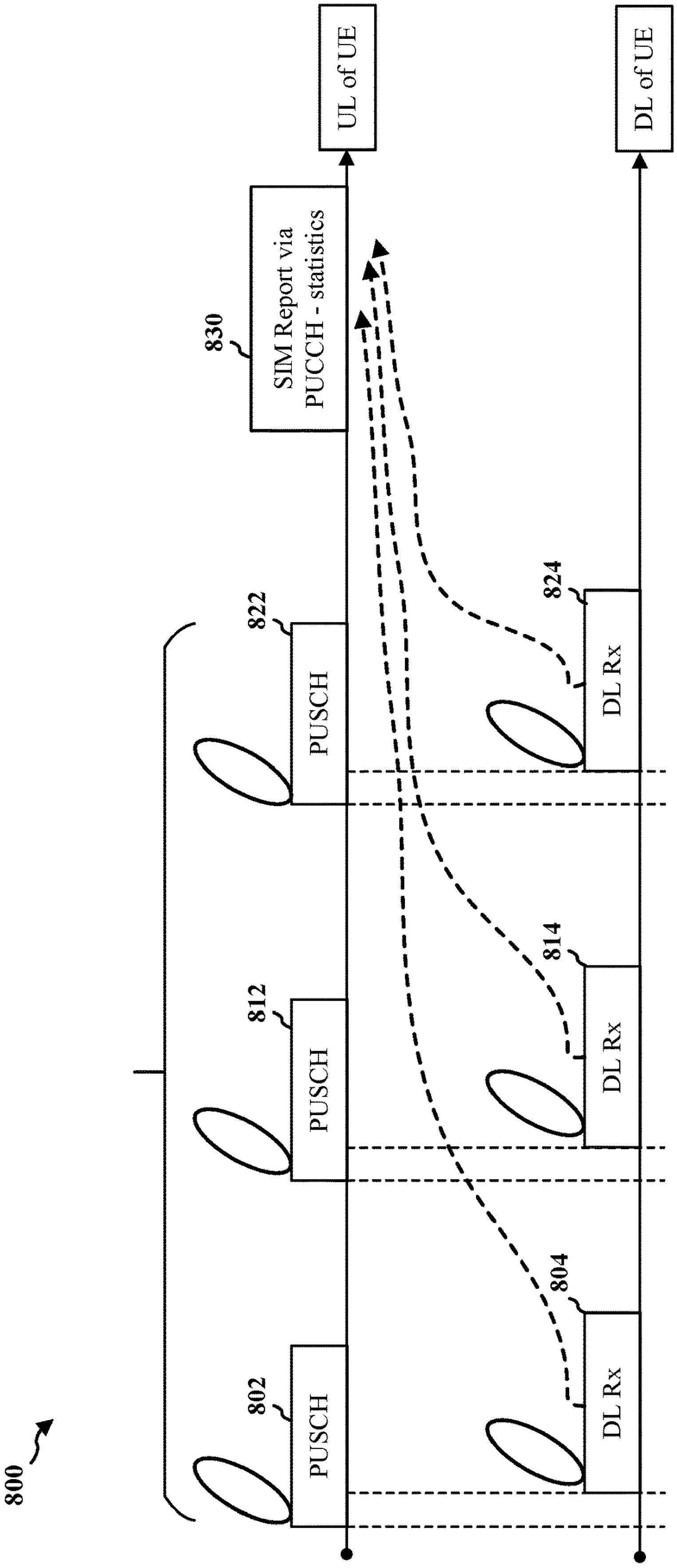
FIG. 8 is a diagram illustrating example SIM report with statistics.

FIG. 8 is a diagram 800 illustrating example SIM report with statistics. In some aspects, the UE SIM report (e.g., in 830) (which may correspond to the SIM report 612) may report the statistics of SI metric per full duplex Tx/Rx beam pair on one or more adjacent (or non-adjacent) DL SBs (DL SB 804, DL SB 814, and DL SB 824) of each UL Tx, e.g., PUSCH occasion (e.g., PUSCH occasion 802, PUSCH occasion 812, and PUSCH occasion 822) (to reflect different leaked interference levels to each adjacent DL SB from the UL Tx in FDMed UE FD mode) in a time window. The time window may be configured by the network entity 604.

Figure 9:
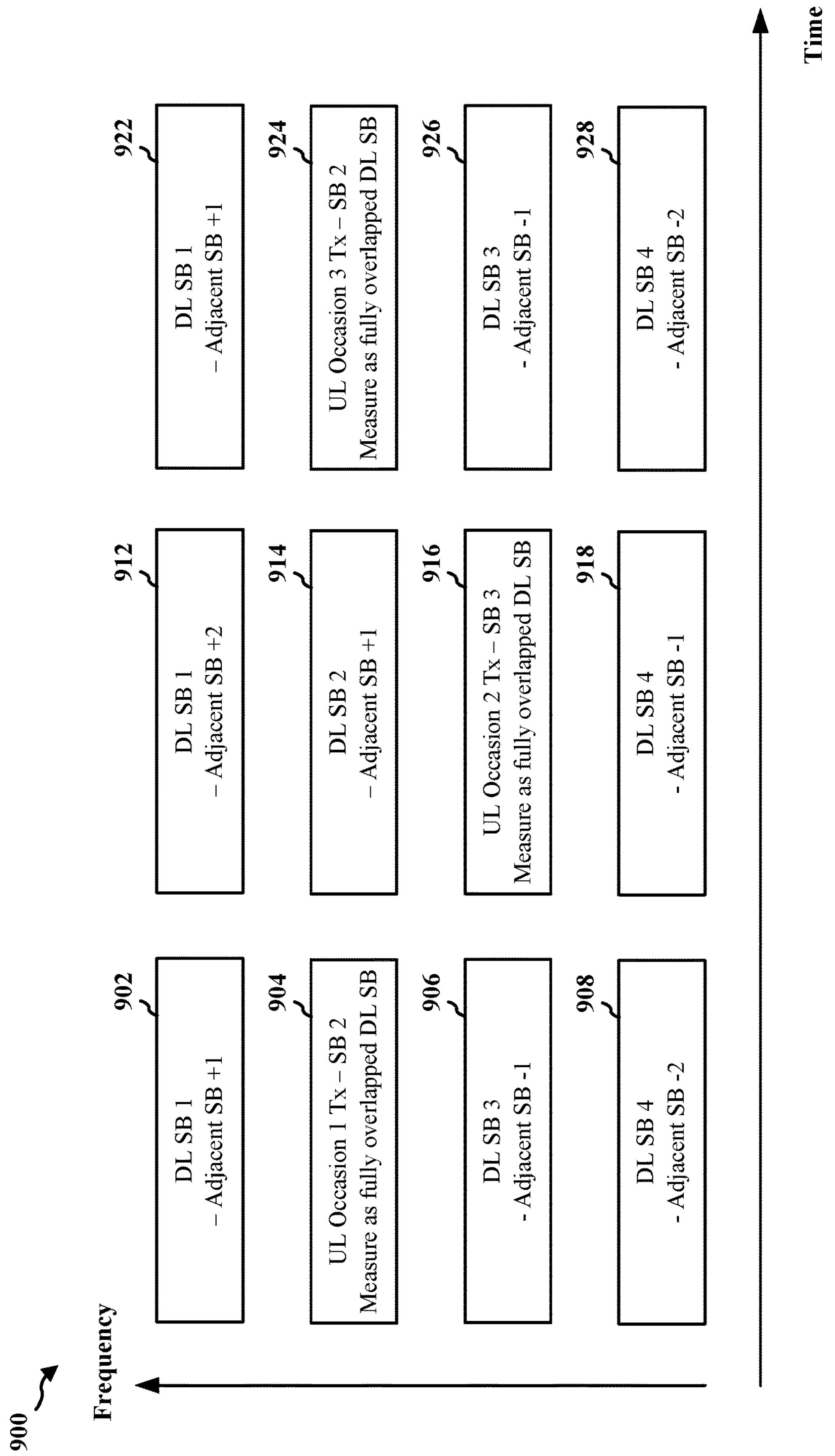
FIG. 9 is a diagram illustrating example subbands (SBs) for SIM report.

FIG. 9 is a diagram 900 illustrating example SBs for SIM report (which may correspond to the SIM report 612). As illustrated in FIG. 9, there may be DL SB 902, DL SB 906, and DL SB 908 around the UL occasion 904 and there may be a DL SB overlapping with the UL occasion 904. There may be DL SB 912, DL SB 914, and DL SB 918 around the UL occasion 916 and there may be a DL SB overlapping with the UL occasion 916. There may be DL SB 922, DL SB 926, and DL SB 928 around the UL occasion 924 and there may be a DL SB overlapping with the UL occasion 924. The statistics in the SIM report may be reported on adjacent SBs of each UL occasion in the time window. For example, for all "adjacent SB+1" SB per occasion (e.g., 902, 914, and 922), the self-interference measured may be averaged over the three UL occasions with each has a leaked received signal strength indicator (RSSI) value measured at adjacent SB+1. In another example, for all UL Tx SB per occasion, SI may be averaged over the three UL occasions with each has a reference signal received power (RSRP) value measured at the overlapped DL SB. The +Y/−Y adjacent SB may be averaged together or separately.

Figure 10:
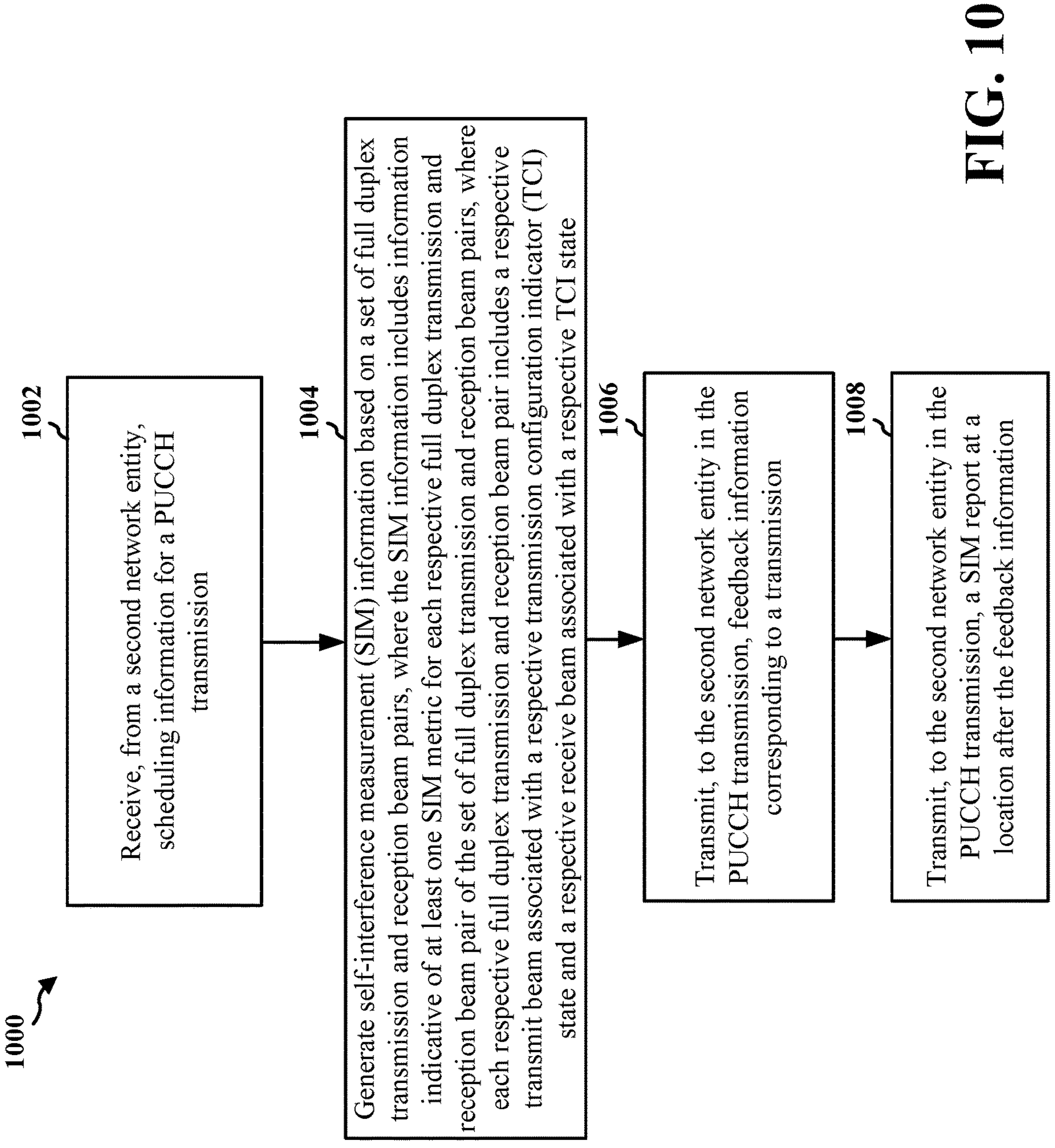
FIG. 10 is a flowchart of a method of wireless communication.

FIG. 10 is a flowchart 1000 of a method of wireless communication. The method may be performed by a first network entity, such as a UE (e.g., the UE 104, the UE 602; the apparatus 1804).

At 1002, the first network entity may receive, from a second network entity, scheduling information for a PUCCH transmission. For example, the UE 602 may receive, from a second network entity (e.g., network entity 604), scheduling information 606 for a PUCCH transmission. In some aspects, 1002 may be performed by SIM component 198.

At 1004, the first network entity may generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective TCI state and a respective receive beam associated with a respective TCI state. For example, the UE 602 may generate (e.g., at 608) SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective TCI state and a respective receive beam associated with a respective TCI state. In some aspects, 1004 may be performed by SIM component 198. In some aspects, the multiple RBs may be a set of downlink RBs around one or more uplink RBs or the multiple SBs may be a set of downlink SBs around the one or more uplink RBs. In some aspects, the at least one SIM for each of the set of beams may include a statistic associated with the at least one SIM and the set of downlink RBs or the set of downlink SBs. In some aspects, the statistic may include at least one of an average, a median, or a weighted average of multiple SIM metrics over a time window (e.g., configured by the second network entity). In some aspects, a quantity of the multiple RBs or the multiple SBs is based on a configuration from the second network entity. In some aspects, the multiple RBs or the multiple SBs are configured based on a frequency allocation configuration from the second network entity.

At 1006, the first network entity may transmit, to the second network entity in the PUCCH transmission, feedback information corresponding to a transmission. For example, the UE 602 may transmit, to the second network entity in the PUCCH transmission, feedback information (e.g., 610) corresponding to a transmission. In some aspects, 1006 may be performed by SIM component 198.

At 1008, the first network entity may transmit, to the second network entity in the PUCCH transmission, a SIM report at a location after the feedback information, where the SIM report includes information indicative of the SIM information. For example, the UE 602 may transmit, to the second network entity in the PUCCH transmission, a SIM report (e.g., the SIM report 612) at a location after the feedback information, where the SIM report includes information indicative of the SIM information. In some aspects, 1008 may be performed by SIM component 198. In some aspects, the location is adjacent to the feedback information. In some aspects, the first network entity may receive, from the second network entity, information indicative of the location. In some aspects, the first network entity may receive, from the second network entity, information indicative of a size of the SIM report.

Figure 11:
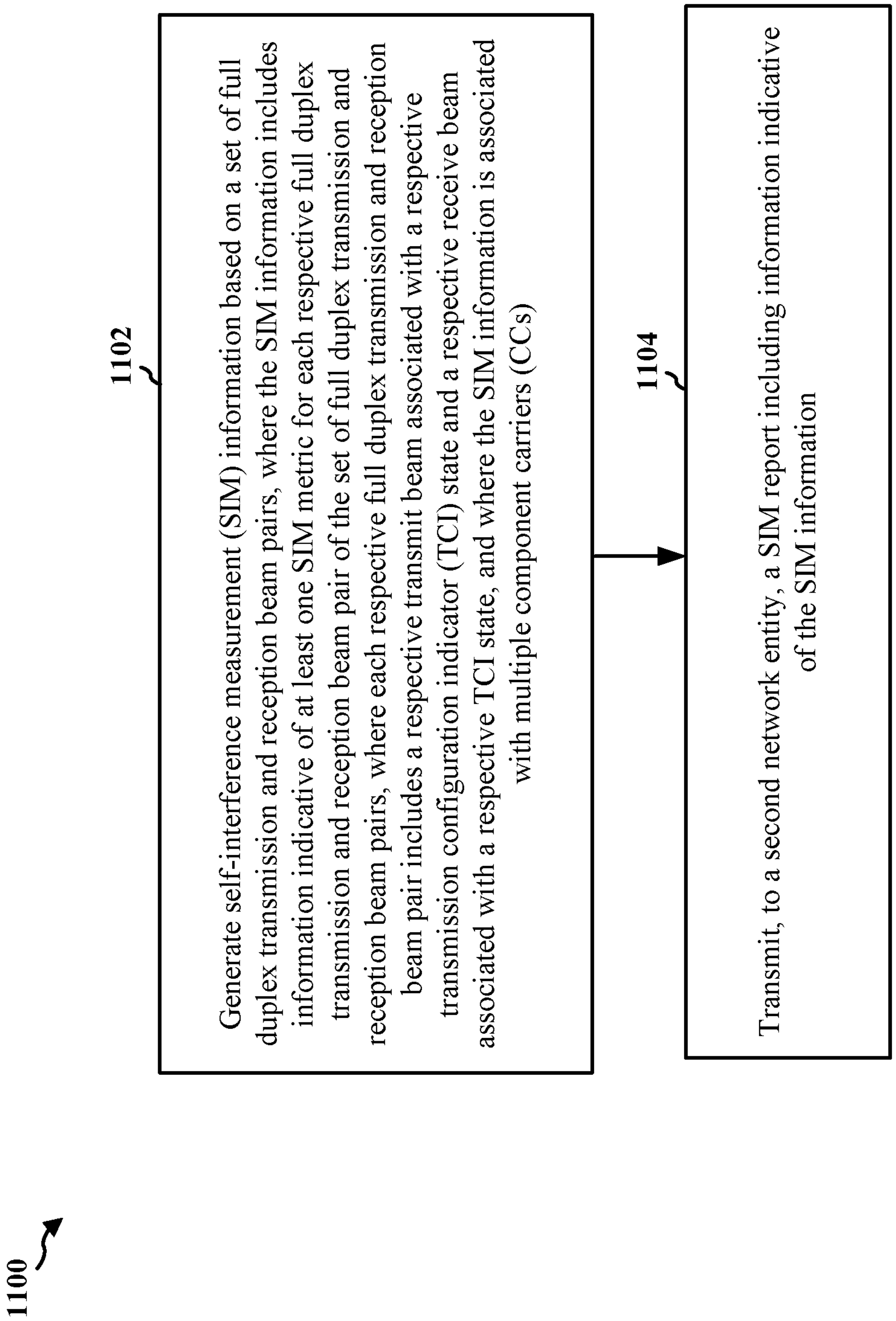
FIG. 11 is a flowchart of a method of wireless communication.

FIG. 11 is a flowchart 1100 of a method of wireless communication. The method may be performed by a first network entity, such as a UE (e.g., the UE 104, the UE 602; the apparatus 1804).

At 1102, the first network entity may generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective TCI state and a respective receive beam associated with a respective TCI state, and where the SIM information is associated with multiple CCs. For example, the UE 602 may generate (e.g., at 608) SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective TCI state and a respective receive beam associated with a respective TCI state, and where the SIM information is associated with multiple CCs. In some aspects, 1102 may be performed by SIM component 198. In some aspects, the multiple CCs may correspond to a set of medium access control (MAC) control element (MAC-CE) active CCs (e.g., CCs activated by MAC-CE). In some aspects, the multiple CCs may correspond to all CCs associated with the second network entity. In some aspects, the multiple CCs may correspond to a set of CCs indicated by the second network entity. In some aspects, the multiple CCs may correspond to a set of CCs recommended by the first network entity. In some aspects, the multiple RB s may be a set of downlink RB s around one or more uplink RB s or the multiple SBs may be a set of downlink SBs around the one or more uplink RBs. In some aspects, the at least one SIM for each of the set of beams may include a statistic associated with the at least one SIM and the set of downlink RBs or the set of downlink SBs. In some aspects, the statistic may include at least one of an average, a median, or a weighted average of multiple SIM metrics over a time window (e.g., configured by the second network entity). In some aspects, a quantity of the multiple RBs or the multiple SBs is based on a configuration from the second network entity. In some aspects, the multiple RBs or the multiple SBs are configured based on a frequency allocation configuration from the second network entity.

At 1104, the first network entity may transmit, to a second network entity, a SIM report including information indicative of the SIM information. For example, the UE 602 may transmit, to a second network entity, a SIM report (e.g., the SIM report 612) including information indicative of the SIM information. In some aspects, 1104 may be performed by SIM component 198.

Figure 12:
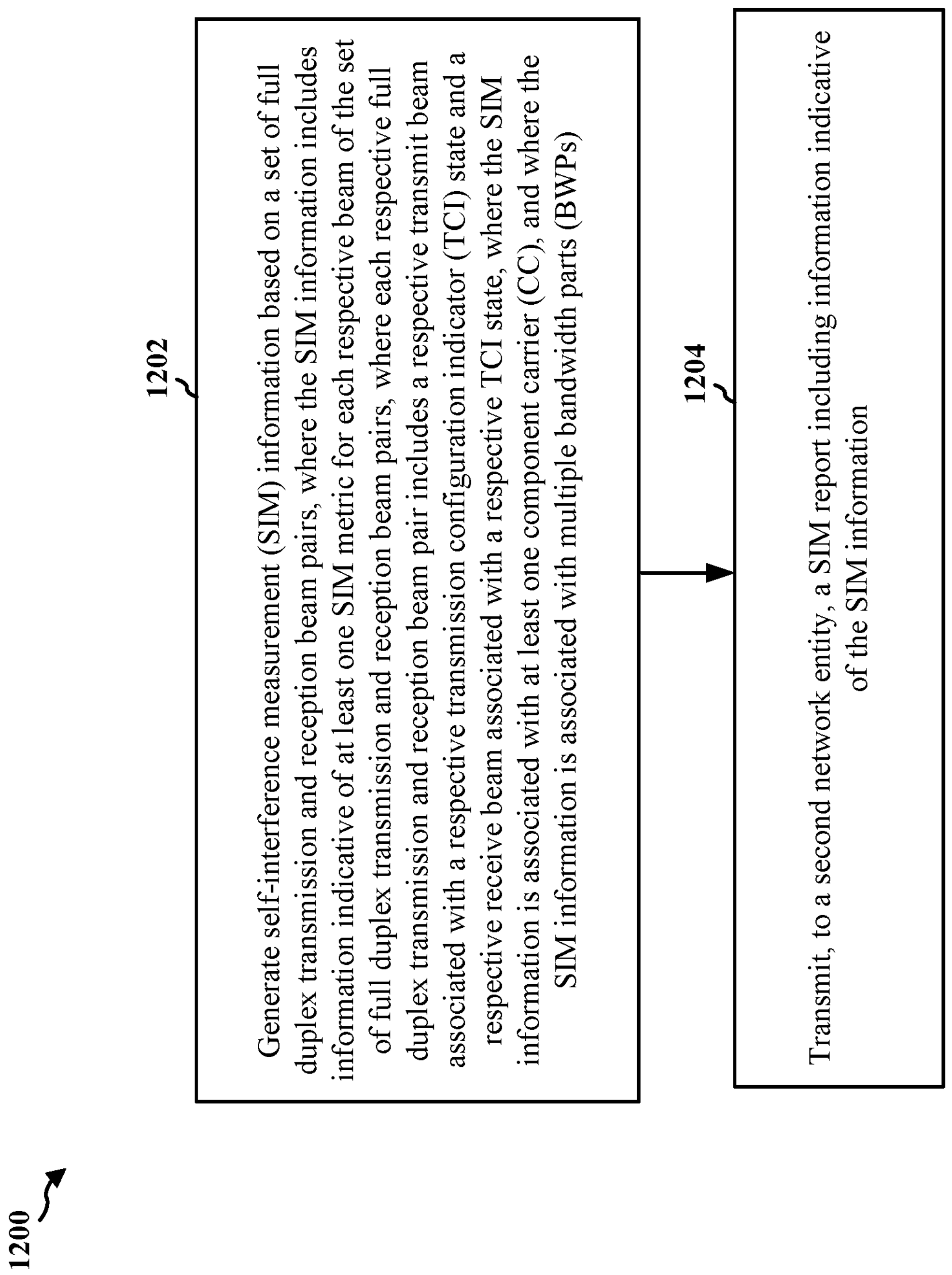
FIG. 12 is a flowchart of a method of wireless communication.

FIG. 12 is a flowchart 1200 of a method of wireless communication. The method may be performed by a first network entity, such as a UE (e.g., the UE 104, the UE 602; the apparatus 1804).

At 1202, the first network entity may generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective TCI state and a respective receive beam associated with a respective TCI state, where the SIM information is associated with at least one CC, and where the SIM information is associated with multiple BWPs. For example, the UE 602 may generate (e.g., at 608) SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective TCI state and a respective receive beam associated with a respective TCI state, where the SIM information is associated with at least one CC, and where the SIM information is associated with multiple BWPs. In some aspects, 1202 may be performed by SIM component 198. In some aspects, the multiple BWPs may correspond to a set of active BWPs. In some aspects, the multiple BWPs may correspond to all BWPs associated with the second network entity. In some aspects, the multiple BWPs may correspond to a set of BWPs indicated by the second network entity. In some aspects, the multiple BWPs may correspond to a set of BWPs recommended by the first network entity. In some aspects, the multiple RBs may be a set of downlink RBs around one or more uplink RBs or the multiple SBs may be a set of downlink SBs around the one or more uplink RBs. In some aspects, the at least one SIM for each of the set of beams may include a statistic associated with the at least one SIM and the set of downlink RBs or the set of downlink SBs. In some aspects, the statistic may include at least one of an average, a median, or a weighted average of multiple SIM metrics over a time window (e.g., configured by the second network entity). In some aspects, a quantity of the multiple RBs or the multiple SBs is based on a configuration from the second network entity. In some aspects, the multiple RBs or the multiple SBs are configured based on a frequency allocation configuration from the second network entity.

At 1204, the first network entity may transmit, to a second network entity, a SIM report including information indicative of the SIM information. For example, the UE 602 may transmit, to a second network entity, a SIM report (e.g., the SIM report 612) including information indicative of the SIM information. In some aspects, 1204 may be performed by SIM component 198.

Figure 13:
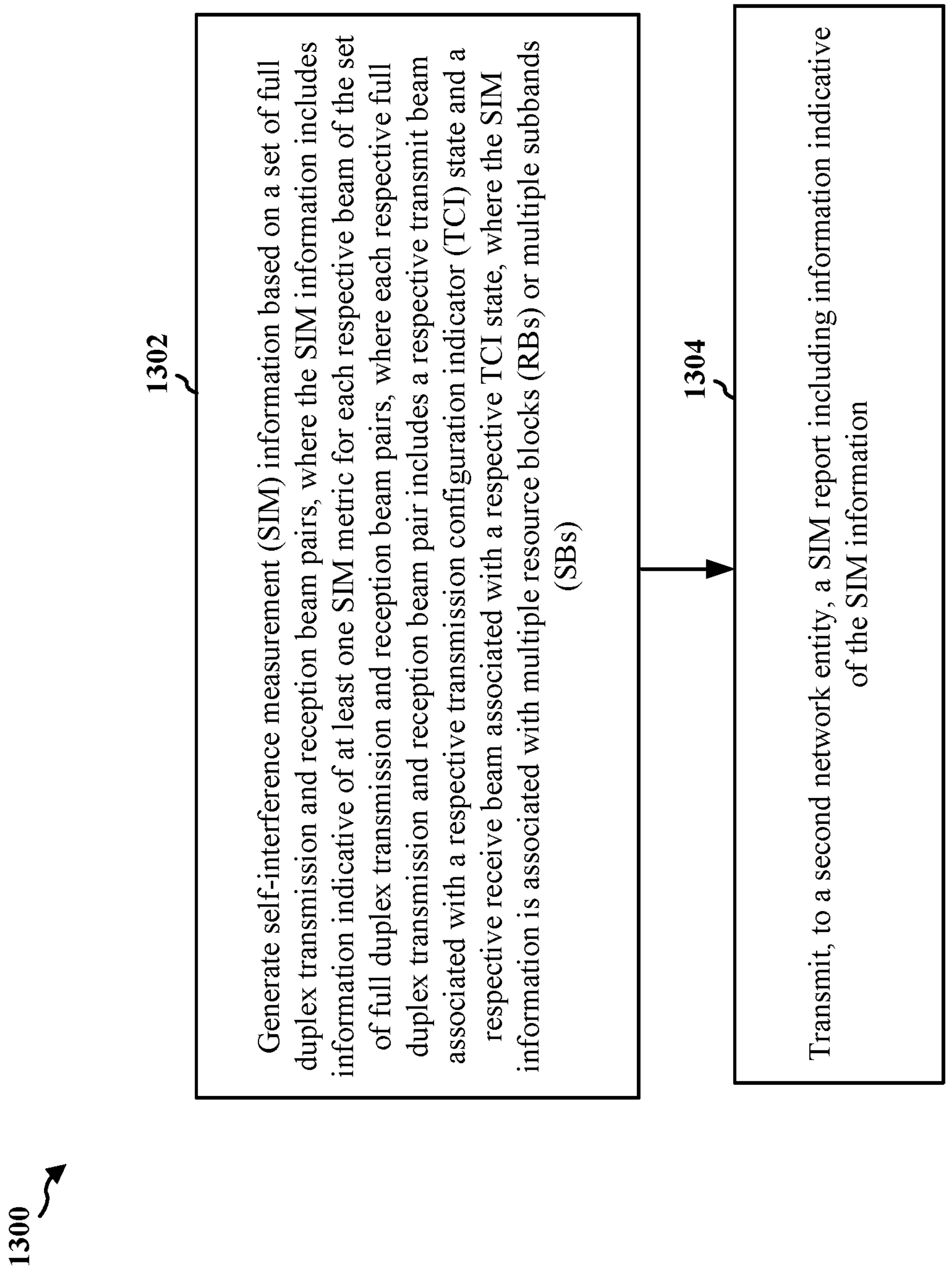
FIG. 13 is a flowchart of a method of wireless communication.

FIG. 13 is a flowchart 1300 of a method of wireless communication. The method may be performed by a first network entity, such as a UE (e.g., the UE 104, the UE 602; the apparatus 1804).

At 1302, the first network entity may generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective TCI state and a respective receive beam associated with a respective TCI state, where the SIM information is associated with multiple resource blocks (RBs) or multiple subbands (SBs). For example, the UE 602 may generate (e.g., at 608) SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective TCI state and a respective receive beam associated with a respective TCI state, where the SIM information is associated with multiple resource blocks (RBs) or multiple subbands (SBs). In some aspects, 1302 may be performed by SIM component 198. In some aspects, the multiple RBs are a set of downlink RBs around one or more uplink RBs, or where the multiple SBs are a set of downlink SBs around the one or more uplink RBs. In some aspects, the set of downlink RBs or the set of downlink SBs are adjacent to the one or more uplink RBs in a frequency domain and overlap with the one or more uplink RBs in a time window. In some aspects, the at least one SIM for each respective beam of the set of beams includes a statistic associated with the at least one SIM and the set of downlink RBs or the set of downlink SBs. In some aspects, the statistic includes at least one of an average, a median, or a weighted average of multiple SIM metrics over a time window. In some aspects, a quantity of the multiple RBs or the multiple SBs is based on a configuration from the second network entity. In some aspects, the multiple RBs or the multiple SBs are configured based on a frequency allocation configuration from the second network entity.

At 1304, the first network entity may transmit, to a second network entity, a SIM report including information indicative of the SIM information. For example, the UE 602 may transmit, to a second network entity, a SIM report (e.g., the SIM report 612) including information indicative of the SIM information. In some aspects, 1304 may be performed by SIM component 198.

Figure 14:
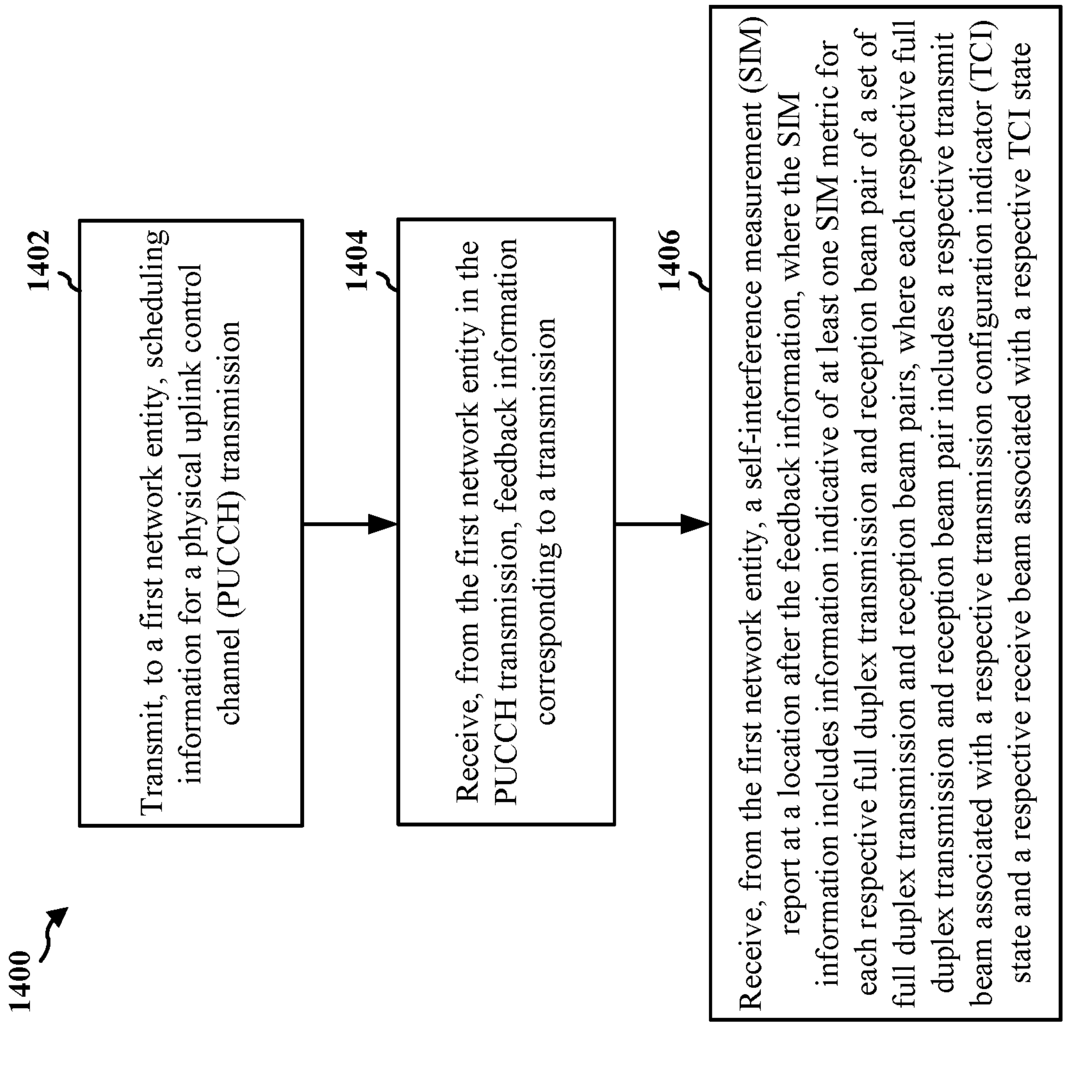
FIG. 14 is a flowchart of a method of wireless communication.

FIG. 14 is a flowchart 1400 of a method of wireless communication. The method may be performed by a second network entity (e.g., the base station 102, the network entity 604, the network entity 1802, the network entity 1902).

At 1402, the network entity may transmit, to a first network entity, scheduling information for a PUCCH transmission. For example, the network entity 604 may transmit, to a first network entity (e.g., the UE 602), scheduling information 606 for a PUCCH transmission. In some aspects, 1402 may be performed by SIM component 199.

At 1404, the network entity may receive, from the first network entity in the PUCCH transmission, feedback information corresponding to a transmission. For example, the network entity 604 may receive, from the first network entity in the PUCCH transmission, feedback information (e.g., 610) corresponding to a transmission. In some aspects, 1404 may be performed by SIM component 199. In some aspects, the multiple RB s may be a set of downlink RBs around one or more uplink RB s or the multiple SBs may be a set of downlink SBs around the one or more uplink RBs. In some aspects, the at least one SIM for each of the set of beams may include a statistic associated with the at least one SIM and the set of downlink RB s or the set of downlink SBs. In some aspects, the statistic may include at least one of an average, a median, or a weighted average of multiple SIM metrics over a time window (e.g., configured by the second network entity). In some aspects, a quantity of the multiple RBs or the multiple SBs is based on a configuration from the second network entity. In some aspects, the multiple RBs or the multiple SBs are configured based on a frequency allocation configuration from the second network entity.

At 1406, the network entity may receive, from the first network entity, a SIM report at a location after the feedback information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state. For example, the network entity 604 may receive, from the first network entity, a SIM report (e.g., the SIM report 612) at a location after the feedback information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state. In some aspects, 1406 may be performed by SIM component 199. In some aspects, the location is adjacent to the feedback information. In some aspects, the second network entity may transmit, to the first network entity, information indicative of the location. In some aspects, the second network entity may transmit, to the first network entity, information indicative of a size of the SIM report.

Figure 15:
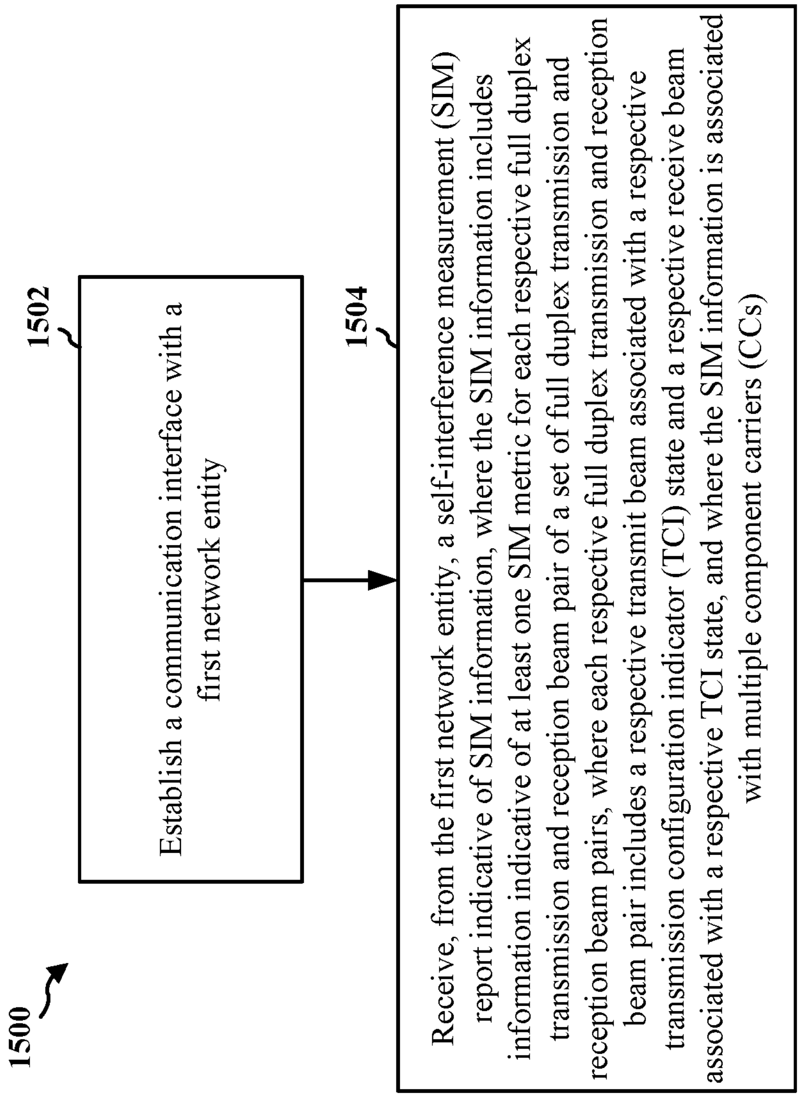
FIG. 15 is a flowchart of a method of wireless communication.

FIG. 15 is a flowchart 1500 of a method of wireless communication. The method may be performed by a second network entity (e.g., the base station 102, the network entity 604, the network entity 1802, the network entity 1902).

At 1502, the network entity may establish a communication interface with a first network entity. For example, the network entity 604 may establish a communication interface (e.g., which enables transmission of scheduling information 606 for PUCCH transmission) with a first network entity (e.g., UE 602). In some aspects, 1502 may be performed by SIM component 199.

At 1504, the network entity may receive, from the first network entity, a SIM report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with multiple CCs. For example, the network entity 604 may receive, from the first network entity, a SIM report (e.g., the SIM report 612) indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with multiple CCs. In some aspects, 1504 may be performed by SIM component 199. In some aspects, the multiple CCs may correspond to a set of medium access control (MAC) control element (MAC-CE) active CCs. In some aspects, the multiple CCs may correspond to all CCs associated with the second network entity. In some aspects, the multiple CCs may correspond to a set of CCs indicated by the second network entity. In some aspects, the multiple CCs may correspond to a set of CCs recommended by the first network entity. In some aspects, the multiple RBs may be a set of downlink RBs around one or more uplink RBs or the multiple SBs may be a set of downlink SBs around the one or more uplink RBs. In some aspects, the at least one SIM for each of the set of beams may include a statistic associated with the at least one SIM and the set of downlink RBs or the set of downlink SBs. In some aspects, the statistic may include at least one of an average, a median, or a weighted average of multiple SIM metrics over a time window (e.g., configured by the second network entity). In some aspects, a quantity of the multiple RBs or the multiple SBs is based on a configuration from the second network entity. In some aspects, the multiple RBs or the multiple SBs are configured based on a frequency allocation configuration from the second network entity.

Figure 16:
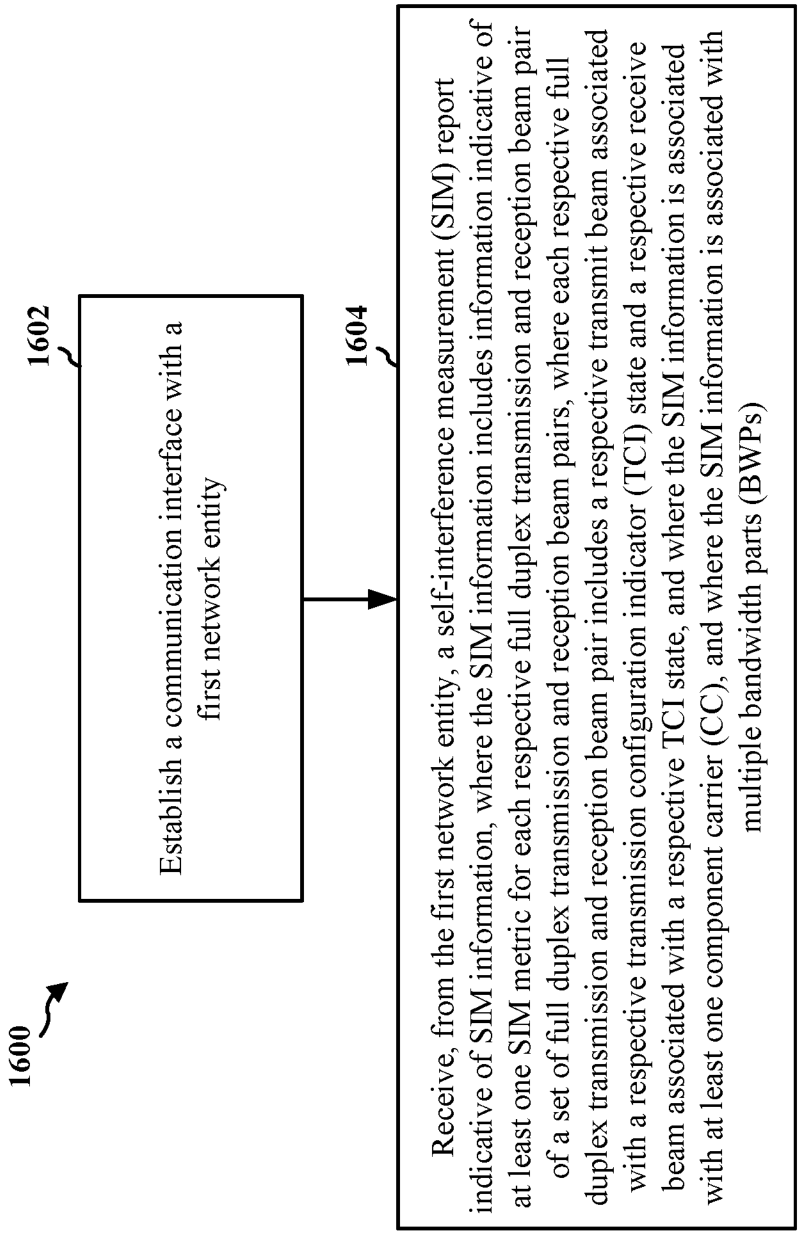
FIG. 16 is a flowchart of a method of wireless communication.

FIG. 16 is a flowchart 1600 of a method of wireless communication. The method may be performed by a second network entity (e.g., the base station 102, the network entity 604, the network entity 1802, the network entity 1902).

At 1602, the network entity may establish a communication interface with a first network entity. For example, the network entity 604 may establish a communication interface (e.g., which enables transmission of scheduling information 606 for PUCCH transmission) with a first network entity (e.g., UE 602). In some aspects, 1602 may be performed by SIM component 199.

At 1604, the network entity may receive, from the first network entity, a SIM report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with at least one CC, and where the SIM information is associated with multiple BWPs. For example, the network entity 604 may receive, from the first network entity, a SIM report (e.g., the SIM report 612) indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with at least one CC, and where the SIM information is associated with multiple BWPs. In some aspects, 1604 may be performed by SIM component 199. In some aspects, the multiple BWPs may correspond to a set of active BWPs. In some aspects, the multiple BWPs may correspond to all BWPs associated with the second network entity. In some aspects, the multiple BWPs may correspond to a set of BWPs indicated by the second network entity. In some aspects, the multiple BWPs may correspond to a set of BWPs recommended by the first network entity. In some aspects, the multiple RBs may be a set of downlink RBs around one or more uplink RBs or the multiple SBs may be a set of downlink SBs around the one or more uplink RBs. In some aspects, the at least one SIM for each of the set of beams may include a statistic associated with the at least one SIM and the set of downlink RBs or the set of downlink SBs. In some aspects, the statistic may include at least one of an average, a median, or a weighted average of multiple SIM metrics over a time window (e.g., configured by the second network entity). In some aspects, a quantity of the multiple RBs or the multiple SBs is based on a configuration from the second network entity. In some aspects, the multiple RBs or the multiple SBs are configured based on a frequency allocation configuration from the second network entity.

Figure 17:
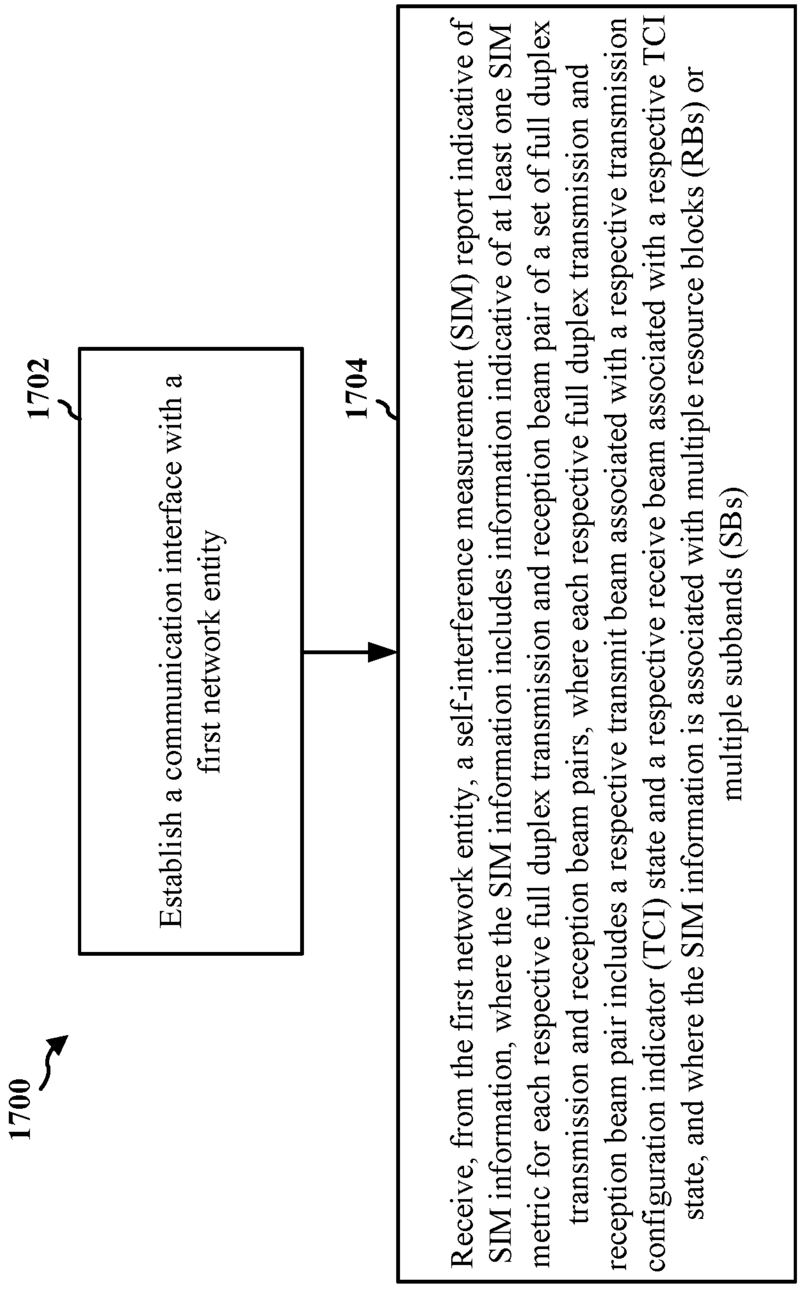
FIG. 17 is a flowchart of a method of wireless communication.

FIG. 17 is a flowchart 1700 of a method of wireless communication. The method may be performed by a second network entity (e.g., the base station 102, the network entity 604, the network entity 1802, the network entity 1902).

At 1702, the network entity may establish a communication interface with a first network entity. For example, the network entity 604 may establish a communication interface (e.g., which enables transmission of scheduling information 606 for PUCCH transmission) with a first network entity (e.g., UE 602). In some aspects, 1702 may be performed by SIM component 199.

At 1704, the network entity may receive, from the first network entity, a SIM report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with multiple resource blocks (RBs) or multiple subbands (SBs). For example, the network entity 604 may receive, from the first network entity, a SIM report (e.g., the SIM report 612) indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with multiple resource blocks (RBs) or multiple subbands (SBs). In some aspects, 1704 may be performed by SIM component 199. In some aspects, the multiple RBs are a set of downlink RBs around one or more uplink RBs, or where the multiple SBs are a set of downlink SBs around the one or more uplink RBs. In some aspects, the set of downlink RBs or the set of downlink SBs are adjacent to the one or more uplink RBs in a frequency domain and overlap with the one or more uplink RBs in a time window. In some aspects, the at least one SIM for each respective beam of the set of beams includes a statistic associated with the at least one SIM and the set of downlink RB s or the set of downlink SBs. In some aspects, the statistic includes at least one of an average, a median, or a weighted average of multiple SIM metrics over a time window. In some aspects, a quantity of the multiple RBs or the multiple SBs is based on a configuration from the second network entity. In some aspects, the multiple RBs or the multiple SBs are configured based on a frequency allocation configuration from the second network entity.

Figure 18:
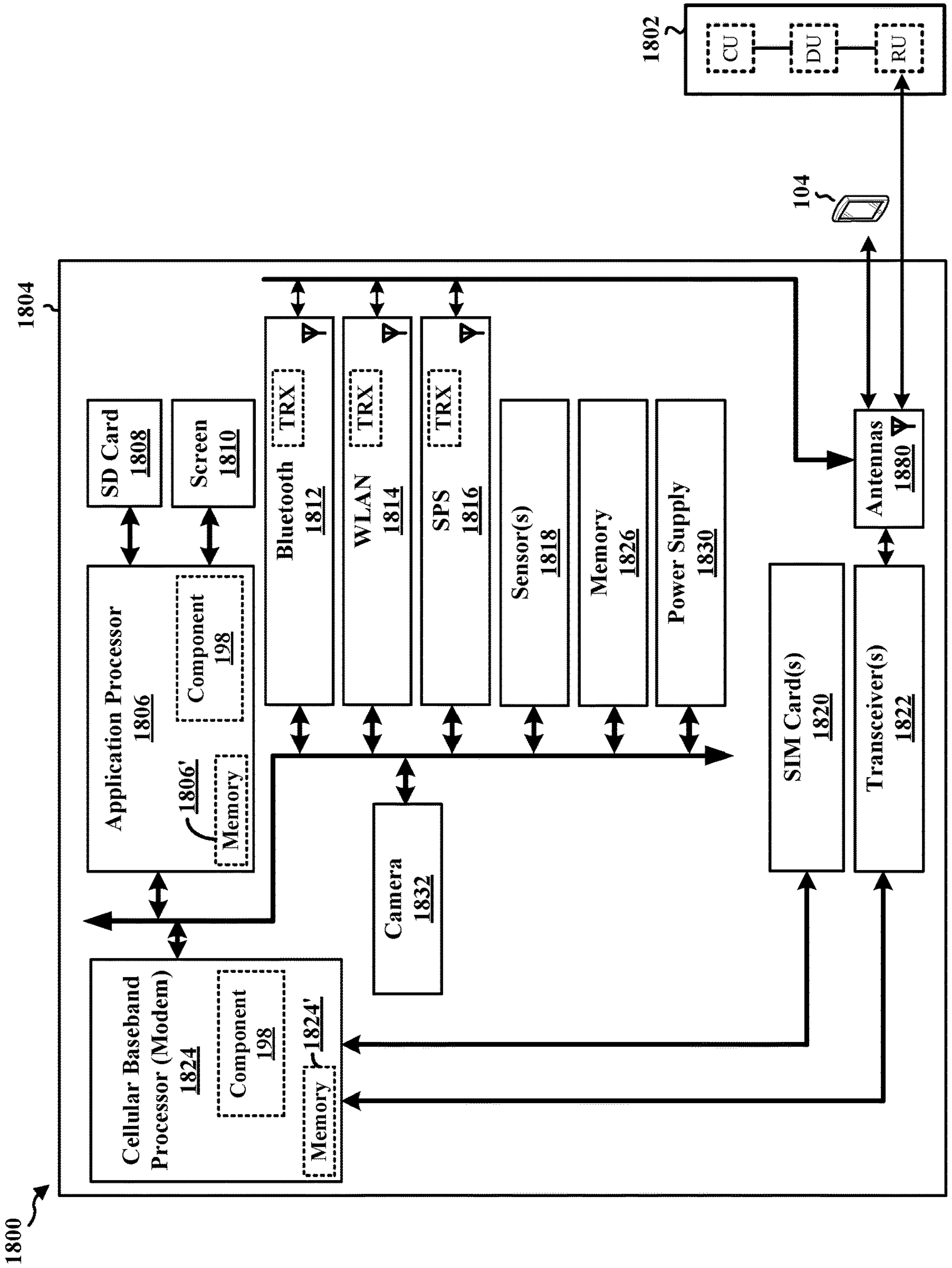
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, a satellite system module 1816 (e.g., GNSS module), one or more sensor modules 1818 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the satellite system module 1816 may include an on-chip transceiver (TRX)/receiver (RX). The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described herein. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see 350 of FIG. 3) and include the additional modules of the apparatus 1804.

As discussed herein, the SIM component 198 may be configured to receive, from a second network entity, scheduling information for a physical uplink control channel (PUCCH) transmission. The SIM component 198 may be further configured to generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state. The SIM component 198 may be further configured to transmit, to the second network entity in the PUCCH transmission, feedback information corresponding to a transmission. The SIM component 198 may be further configured to transmit, to the second network entity in the PUCCH transmission, a SIM report at a location after the feedback information, where the SIM report includes information indicative of the SIM information.

The SIM component 198 may be configured to generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple component carriers (CCs). The SIM component 198 may be further configured to transmit, to a second network entity, a SIM report including information indicative of the SIM information.

The SIM component 198 may be configured to generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with at least one component carrier (CC), and where the SIM information is associated with multiple bandwidth parts (BWPs). The SIM component 198 may be further configured to transmit, to a second network entity, a SIM report including information indicative of the SIM information.

The SIM component 198 may be configured to generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with multiple resource blocks (RBs) or multiple subbands (SBs). The SIM component 198 may be further configured to transmit, to a second network entity, a SIM report including information indicative of the SIM information.

The SIM component 198 may be within the cellular baseband processor 1824, the application processor 1806, or both the cellular baseband processor 1824 and the application processor 1806. The SIM component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, includes means for receiving, from a second network entity, scheduling information for a PUCCH transmission. In some aspects, the apparatus 1804 may further include means for generating SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective TCI state and a respective receive beam associated with a respective TCI state. In some aspects, the apparatus 1804 may further include means for transmitting, to the second network entity in the PUCCH transmission, feedback information corresponding to a transmission. In some aspects, the apparatus 1804 may further include means for transmitting, to the second network entity in the PUCCH transmission, a SIM report at a location after the feedback information, where the SIM report includes information indicative of the SIM information. In some aspects, the apparatus 1804 may further include means for generating SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective TCI state and a respective receive beam associated with a respective TCI state, and where the SIM information is associated with multiple component carriers (CCs). In some aspects, the apparatus 1804 may further include means for generating SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective TCI state and a respective receive beam associated with a respective TCI state, where the SIM information is associated with at least one component carrier (CC), and where the SIM information is associated with multiple bandwidth parts (BWPs). In some aspects, the apparatus 1804 may further include means for generating SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective TCI state and a respective receive beam associated with a respective TCI state, where the SIM information is associated with multiple resource blocks (RBs) or multiple subbands (SBs). In some aspects, the apparatus 1804 may further include means for transmitting, to the second network entity, a SIM report including information indicative of the SIM information. The means may be the SIM component 198 of the apparatus 1804 configured to perform the functions recited by the means. As described herein, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
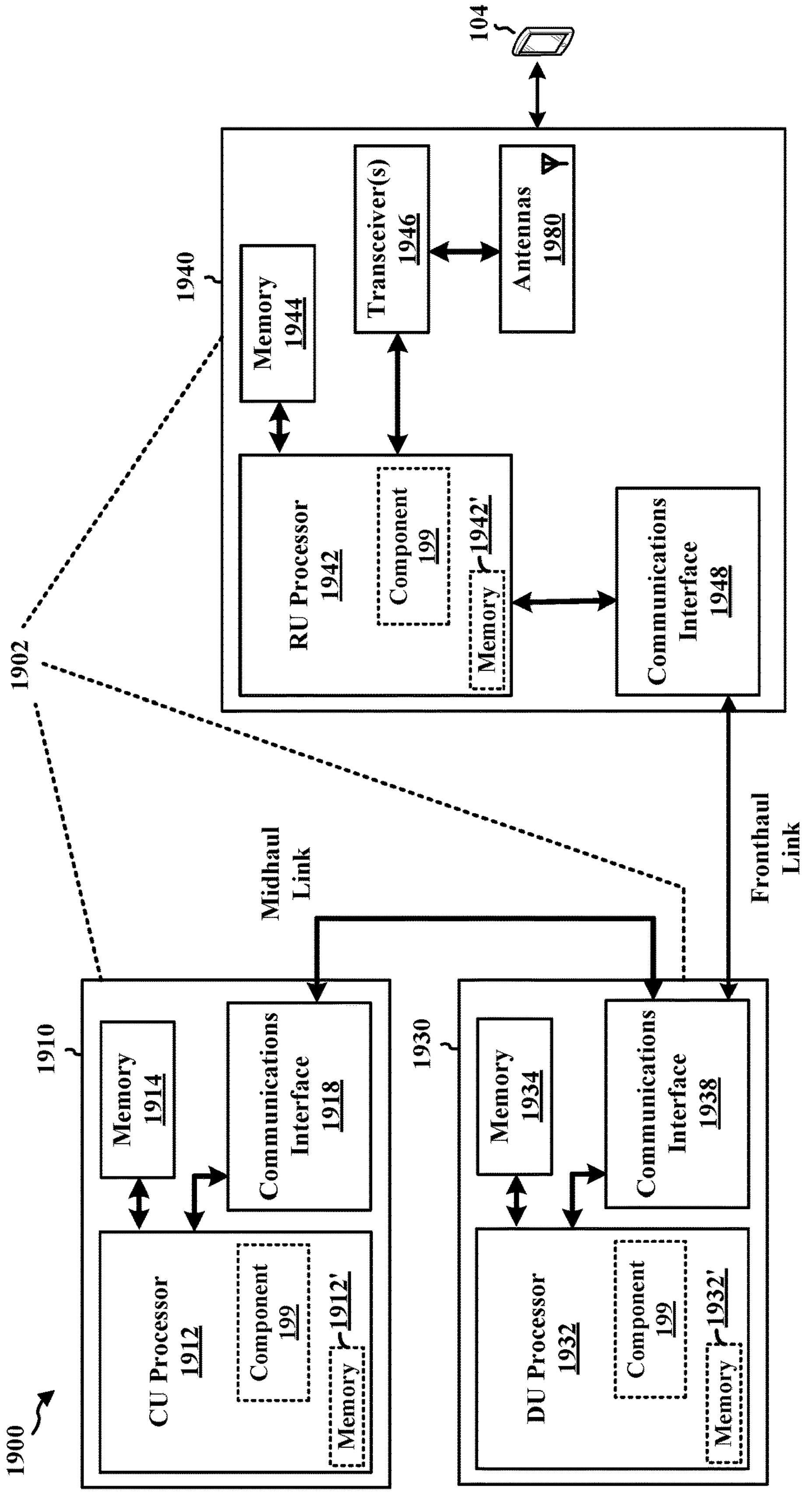
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the SIM component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the SIM component 199 may be configured to transmit, to a first network entity, scheduling information for a physical uplink control channel (PUCCH) transmission. In some aspects, the SIM component 199 may be configured to receive, from the first network entity in the PUCCH transmission, feedback information corresponding to a transmission. In some aspects, the SIM component 199 may be configured to receive, from the first network entity, a self-interference measurement (SIM) report at a location after the feedback information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state.

In some aspects, the SIM component 199 may be configured to establish a communication interface with a first network entity. In some aspects, the SIM component 199 may be configured to receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple component carriers (CCs).

In some aspects, the SIM component 199 may be configured to establish a communication interface with a first network entity. In some aspects, the SIM component 199 may be configured to receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with at least one component carrier (CC), and where the SIM information is associated with multiple bandwidth parts (BWPs).

In some aspects, the SIM component 199 may be configured to establish a communication interface with a first network entity. In some aspects, the SIM component 199 may be configured to receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple resource blocks (RBs) or multiple subbands (SBs).

The SIM component 199 may be within one or more processors of one or more of the CU 1910, DU 1930, and the RU 1940. The SIM component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 includes means for transmitting, to a first network entity, scheduling information for a PUCCH transmission. In some aspects, the network entity 1902 may further include means for receiving, from the first network entity in the PUCCH transmission, feedback information corresponding to a transmission. In some aspects, the network entity 1902 may further include means for receiving, from the first network entity, a SIM report at a location after the feedback information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state. In some aspects, the network entity 1902 may further include means for establishing a communication interface with a first network entity. In some aspects, the network entity 1902 may further include means for receiving, from the first network entity, a SIM report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with multiple component carriers (CCs). In some aspects, the network entity 1902 may further include means for receiving, from the first network entity, a SIM report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with at least one component carrier (CC), and where the SIM information is associated with multiple bandwidth parts (BWPs). In some aspects, the network entity 1902 may further include means for receiving, from the first network entity, a SIM report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective TCI state and a respective receive beam associated with a respective TCI state, and where the SIM information is associated with multiple resource blocks (RBs) or multiple subbands (SBs). The means may be the SIM component 199 of the network entity 1902 configured to perform the functions recited by the means. As described herein, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a first network entity for wireless communication, including: a memory; and at least one processor coupled to the memory, where the at least one processor is configured to: receive, from a second network entity, scheduling information for a physical uplink control channel (PUCCH) transmission; generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state; transmit, to the second network entity in the PUCCH transmission, feedback information (e.g., ACK or NACK) corresponding to a transmission (e.g., a PDSCH transmission); and transmit, to the second network entity in the PUCCH transmission, a SIM report at a location after the feedback information, where the SIM report includes information indicative of the SIM information.

Aspect 2 is the first network entity of aspect 1, where the location is adjacent to the feedback information.

Aspect 3 is the first network entity of any of aspects 1-2, where the at least one processor is configured to: receive, from the second network entity, information indicative of the location.

Aspect 4 is the first network entity of any of aspects 1-3, where the at least one processor is configured to: receive, from the second network entity, information indicative of a size of the SIM report.

Aspect 5 is the first network entity of any of aspects 1-4, where the at least one SIM metric includes at least one of: a reference signal received power (RSRP) or a received signal strength indicator (RSSI).

Aspect 6 is a first network entity for wireless communication, including: a memory; and at least one processor coupled to the memory, where the at least one processor is configured to: generate SIM information based on a set of full duplex transmission and reception beam pairs, where the SIM information includes information indicative of at least one SIM metric for each respective full duplex transmission and reception beam pair of the set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple component carriers (CCs); and transmit, to a second network entity, a SIM report including information indicative of the SIM information.

Aspect 7 is the first network entity of aspect 6, where the multiple CCs correspond to a set of medium access control (MAC) control element (MAC-CE) active CCs.

Aspect 8 is the first network entity of any of aspects 6-7, where the multiple CCs correspond to all CCs associated with the second network entity.

Aspect 9 is the first network entity of any of aspects 6-8, where the multiple CCs correspond to a set of CCs indicated by the second network entity.

Aspect 10 is the first network entity of any of aspects 6-9, where the multiple CCs correspond to a set of CCs recommended by the first network entity.

Aspect 11 is the first network entity of any of aspects 6-10, where the at least one SIM metric includes at least one of: a reference signal received power (RSRP) or a received signal strength indicator (RSSI).

Aspect 12 is a first network entity for wireless communication, including: a memory; and at least one processor coupled to the memory, where the at least one processor is configured to: generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with at least one component carrier (CC), and where the SIM information is associated with multiple bandwidth parts (BWPs); and transmit, to a second network entity, a SIM report including information indicative of the SIM information.

Aspect 13 is the first network entity of aspect 12, where the multiple BWPs correspond to a set of active BWPs.

Aspect 14 is the first network entity of any of aspects 12-13, where the multiple BWPs correspond to all BWPs associated with the second network entity Aspect 15 is the first network entity of any of aspects 12-14, where the multiple BWPs correspond to a set of BWPs indicated by the second network entity Aspect 16 is the first network entity of any of aspects 12-15, where the multiple BWPs correspond to a set of BWPs recommended by the first network entity.

Aspect 17 is the first network entity of any of aspects 12-16, where the at least one SIM metric includes at least one of: a reference signal received power (RSRP) or a received signal strength indicator (RSSI).

Aspect 18 is a first network entity for wireless communication, including: a memory; and at least one processor coupled to the memory, where the at least one processor is configured to: generate SIM information based on a set of full duplex transmission and reception beam pairs, where the SIM information includes information indicative of at least one SIM metric for each respective beam of the set of full duplex transmission and reception beam pairs, where each respective full duplex transmission and reception beam pair includes a respective transmit beam associated with a respective transmission configuration indicator (TCI) state and a respective receive beam associated with a respective TCI state, where the SIM information is associated with multiple resource blocks (RBs) or multiple subbands (SBs); and transmit, to a second network entity, a SIM report including information indicative of the SIM information.

Aspect 19 is the first network entity of aspect 18, where the multiple RBs are a set of downlink RBs around one or more uplink RBs, or where the multiple SBs are a set of downlink SBs around the one or more uplink RBs.

Aspect 20 is the first network entity of any of aspects 18-19, where the set of downlink RBs or the set of downlink SBs are adjacent to the one or more uplink RBs in a frequency domain or fully or partially overlap with the one or more uplink RBs in a time window.

Aspect 21 is the first network entity of any of aspects 18-20, where the SIM information includes a statistic associated with the at least one SIM metric and the set of downlink RBs or the set of downlink SBs.

Aspect 22 is the first network entity of any of aspects 18-21, where the statistic includes at least one of an average, a median, or a weighted average of multiple SIM metrics of the at least one SIM metric over a time window.

Aspect 23 is the first network entity of any of aspects 18-22, where a quantity of the multiple RBs or the multiple SBs is based on a configuration from the second network entity.

Aspect 24 is the first network entity of any of aspects 18-23, where the multiple RBs or the multiple SBs are based on a frequency allocation configuration from the second network entity.

Aspect 25 is the first network entity of any of aspects 18-24, where the at least one SIM metric includes at least one of: a reference signal received power (RSRP) or a received signal strength indicator (RSSI).

Aspect 26 is a second network entity for wireless communication, including: a memory; and at least one processor coupled to the memory, where the at least one processor is configured to: transmit, to a first network entity, scheduling information for a physical uplink control channel (PUCCH) transmission; receive, from the first network entity in the PUCCH transmission, feedback information (e.g., ACK or NACK) corresponding to a transmission (e.g., a PDSCH transmission); and receive, from the first network entity, a self-interference measurement (SIM) report at a location after the feedback information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state.

Aspect 27 is the second network entity of aspect 26, where the location is adjacent to the feedback information.

Aspect 28 is the second network entity of any of aspects 26-27, where the at least one processor is configured to: transmit, to the first network entity, information indicative of the location.

Aspect 29 is the second network entity of any of aspects 26-28, where the at least one processor is configured to: transmit, to the first network entity, information indicative of a size of the SIM report.

Aspect 30 is the second network entity of any of aspects 26-29, where the at least one SIM metric includes at least one of: a reference signal received power (RSRP) or a received signal strength indicator (RSSI).

Aspect 31 is a second network entity for wireless communication, including: a memory; and at least one processor coupled to the memory, where the at least one processor is configured to: establish a communication interface with a first network entity; and receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple component carriers (CCs).

Aspect 32 is the second network entity of aspect 31, where the multiple CCs correspond to a set of medium access control (MAC) control element (MAC-CE) active CCs.

Aspect 33 is the second network entity of any of aspects 31-32, where the multiple CCs correspond to all CCs associated with the second network entity.

Aspect 34 is the second network entity of any of aspects 31-33, where the multiple CCs correspond to a set of CCs indicated by the second network entity.

Aspect 35 is the second network entity of any of aspects 31-34, where the multiple CCs correspond to a set of CCs recommended by the first network entity.

Aspect 36 is the second network entity of any of aspects 31-35, where the at least one SIM metric includes at least one of: a reference signal received power (RSRP) or a received signal strength indicator (RSSI).

Aspect 37 is a second network entity for wireless communication, including: a memory; and at least one processor coupled to the memory, where the at least one processor is configured to: establish a communication interface with a first network entity; and receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with at least one component carrier (CC), and where the SIM information is associated with multiple bandwidth parts (BWPs).

Aspect 38 is the second network entity of aspect 37, where the multiple BWPs correspond to a set of active BWPs.

Aspect 39 is the second network entity of any of aspects 37-38, where the multiple BWPs correspond to all BWPs associated with the second network entity.

Aspect 40 is the second network entity of any of aspects 37-39, where the multiple BWPs correspond to a set of BWPs indicated by the second network entity.

Aspect 41 is the second network entity of any of aspects 37-40, where the multiple BWPs correspond to a set of BWPs recommended by the first network entity.

Aspect 42 is the second network entity of any of aspects 37-41, where the at least one SIM metric includes at least one of: a reference signal received power (RSRP) or a received signal strength indicator (RSSI).

Aspect 43 is a second network entity for wireless communication, including: a memory; and at least one processor coupled to the memory, where the at least one processor is configured to: establish a communication interface with a first network entity; and receive, from the first network entity, a self-interference measurement (SIM) report indicative of SIM information, where the SIM information includes information indicative of at least one SIM metric for each respective full duplex transmission and reception beam pair of a set of full duplex transmission and reception beam pairs, where each respective full duplex transmission and reception beam pair includes a respective transmit beam associated with a respective transmission configuration indicator (TCI) state and a respective receive beam associated with a respective TCI state, and where the SIM information is associated with multiple resource blocks (RBs) or multiple subbands (SBs).

Aspect 44 is the second network entity of aspect 43, where the multiple RBs are a set of downlink RBs around one or more uplink RBs, or where the multiple SBs are a set of downlink SBs around the one or more uplink RBs.

Aspect 45 is the second network entity of any of aspects 43-44, where the set of downlink RBs or the set of downlink SBs are adjacent to the one or more uplink RBs in a frequency domain and overlap with the one or more uplink RBs in a time window.

Aspect 46 is the second network entity of any of aspects 43-45, where the SIM information includes a statistic associated with the at least one SIM metric and the set of downlink RBs or the set of downlink SBs.

Aspect 47 is the second network entity of any of aspects 43-46, where the statistic includes at least one of an average, a median, or a weighted average of multiple SIM metrics of the at least one SIM metric over a time window.

Aspect 48 is the second network entity of any of aspects 43-47, where a quantity of the multiple RBs or the multiple SBs is based on a configuration.

Aspect 49 is the second network entity of any of aspects 43-48, where the multiple RBs or the multiple SBs are based on a frequency allocation configuration.

Aspect 50 is the second network entity of any of aspects 43-49, where the at least one metric includes at least one of: a reference signal received power (RSRP) or a received signal strength indicator (RSSI).

Aspect 51 is a method of wireless communication for implementing any of aspects 1 to 25.

Aspect 52 is an apparatus for wireless communication including means for implementing any of aspects 1 to 25.

Aspect 53 is a computer-readable medium (e.g., a non-transitory computer-readable medium) storing computer executable code, where the code when executed by a processor causes the processor to implement any of aspects 1 to 25.

Aspect 54 is a method of wireless communication for implementing any of aspects 25 to 50.

Aspect 55 is an apparatus for wireless communication including means for implementing any of aspects 25 to 50.

Aspect 56 is a computer-readable medium (e.g., a non-transitory computer-readable medium) storing computer executable code, where the code when executed by a processor causes the processor to implement any of aspects 25 to 50.

What is claimed is:

1. A first network entity for wireless communication, comprising:

memory; and at least one processor coupled to the memory, wherein the at least one processor is configured to:

receive, from a second network entity, scheduling information for a physical uplink control channel (PUCCH) transmission;

generate self-interference measurement (SIM) information based on a set of full duplex transmission and reception beam pairs, wherein the SIM information includes information indicative of at least one SIM metric measured for each respective full duplex transmission and reception beam pair of the set of full duplex transmission and reception beam pairs, wherein each respective full duplex transmission and reception beam pair includes a respective transmit beam associated with a respective transmission configuration indicator (TCI) state and a respective receive beam associated with a respective TCI state;

transmit, to the second network entity in the PUCCH transmission, hybrid automatic repeat request (HARQ) acknowledgment or negative acknowledgement (ACK/NACK) feedback information corresponding to a transmission; and transmit, to the second network entity in the PUCCH transmission that includes the HARQ ACK/NACK feedback information, a SIM report at a location in the PUCCH transmission after the HARQ ACK/NACK feedback information, wherein the SIM report includes information indicative of the SIM information measured for the set of full duplex transmission and reception beam pairs.

2. The first network entity of claim 1, wherein the location is adjacent to the HARQ ACK/NACK feedback information.

3. The first network entity of claim 1, wherein the at least one processor is configured to: receive, from the second network entity, information indicative of the location.

4. The first network entity of claim 1, wherein the at least one processor is configured to: receive, from the second network entity, information indicative of a size of the SIM report.

5. The first network entity of claim 1, wherein the at least one SIM metric includes at least one of: a reference signal received power (RSRP) or a received signal strength indicator (RSSI).

6. A first network entity for wireless communication, comprising:

memory; and at least one processor coupled to the memory, wherein the at least one processor is configured to:

generate self-interference measurement (SIM) information based on a set of full duplex transmission and reception beam pairs, wherein the SIM information includes information indicative of at least one SIM metric measured for each respective full duplex transmission and reception beam pair of the set of full duplex transmission and reception beam pairs, wherein each respective full duplex transmission and reception beam pair includes a respective transmit beam associated with a respective transmission configuration indicator (TCI) state and a respective receive beam associated with a respective TCI state, and wherein the SIM information is associated with multiple component carriers (CCs); and transmit, to a second network entity, a SIM report including information indicative of the SIM information measured for the set of full duplex transmission and reception beam pairs, wherein the SIM report indicates the SIM information measured for each CC of the multiple CCs.

7. The first network entity of claim 6, wherein the multiple CCs correspond to a set of medium access control (MAC) control element (MAC-CE) active CCs.

8. The first network entity of claim 6, wherein the multiple CCs correspond to all CCs associated with the second network entity.

9. The first network entity of claim 6, wherein the multiple CCs correspond to a set of CCs indicated by the second network entity.

10. The first network entity of claim 6, wherein the multiple CCs correspond to a set of CCs recommended by the first network entity.

11. The first network entity of claim 6, wherein the at least one SIM metric includes at least one of: a reference signal received power (RSRP) or a received signal strength indicator (RSSI).

12. A first network entity for wireless communication, comprising:

memory; and at least one processor coupled to the memory, wherein the at least one processor is configured to:

generate self-interference measurement (SIM) information based on a set of full duplex transmission and reception beam pairs, wherein the SIM information includes information indicative of at least one SIM metric measured for each respective beam of the set of full duplex transmission and reception beam pairs, wherein each respective full duplex transmission and reception beam pair includes a respective transmit beam associated with a respective transmission configuration indicator (TCI) state and a respective receive beam associated with a respective TCI state, wherein the SIM information is associated with at least one component carrier (CC), and wherein the SIM information is associated with multiple bandwidth parts (BWPs); and transmit, to a second network entity, a SIM report including information indicative of the SIM information measured for the set of full duplex transmission and reception beam pairs, wherein the SIM report indicates the SIM information measured for each BWP of the multiple BWPs.

13. The first network entity of claim 12, wherein the multiple BWPs correspond to a set of active BWPs.

14. The first network entity of claim 12, wherein the multiple BWPs correspond to all BWPs associated with the second network entity.

15. The first network entity of claim 12, wherein the multiple BWPs correspond to a set of BWPs indicated by the second network entity.

16. The first network entity of claim 12, wherein the multiple BWPs correspond to a set of BWPs recommended by the first network entity.

17. The first network entity of claim 12, wherein the at least one SIM metric includes at least one of: a reference signal received power (RSRP) or a received signal strength indicator (RSSI).

18. A first network entity for wireless communication, comprising:

memory; and at least one processor coupled to the memory, wherein the at least one processor is configured to:

generate self-interference measurement (SIM) information based on a set of full duplex transmission and reception beam pairs, wherein the SIM information includes information indicative of at least one SIM metric measured for each respective beam of the set of full duplex transmission and reception beam pairs, wherein each respective full duplex transmission and reception beam pair includes a respective transmit beam associated with a respective transmission configuration indicator (TCI) state and a respective receive beam associated with a respective TCI state, wherein the SIM information is indicated for multiple resource blocks (RBs) or multiple subbands (SBs); and transmit, to a second network entity, a SIM report including information indicative of the SIM information measured for the set of full duplex transmission and reception beam pairs, wherein the SIM report indicates the SIM information measured for each set of one or more RBs of the multiple RBs or each set of one or more SBs of the multiple sub-bands.

19. The first network entity of claim 18, wherein the multiple RBs are a set of downlink RBs around one or more uplink RBs, or wherein the multiple SBs are a set of downlink SBs around the one or more uplink RBs.

20. The first network entity of claim 19, wherein the set of downlink RBs or the set of downlink SBs are adjacent to the one or more uplink RBs in a frequency domain or fully or partially overlap with the one or more uplink RBs in a time window.

21. The first network entity of claim 19, wherein the SIM information comprises a statistic associated with the at least one SIM metric and the set of downlink RBs or the set of downlink SBs.

22. The first network entity of claim 21, wherein the statistic comprises at least one of an average, a median, or a weighted average of multiple SIM metrics of the at least one SIM metric over a time window.

23. The first network entity of claim 18, wherein a quantity of the multiple RBs or the multiple SBs is based on a configuration from the second network entity.

24. The first network entity of claim 18, wherein the multiple RBs or the multiple SBs are based on a frequency allocation configuration from the second network entity.

25. The first network entity of claim 18, wherein the at least one SIM metric includes at least one of: a reference signal received power (RSRP) or a received signal strength indicator (RSSI).

* * * * *